(12) United States Patent
Arai

(10) Patent No.: US 7,706,236 B2
(45) Date of Patent: Apr. 27, 2010

(54) OPTICAL PICKUP AND OPTICAL DISC APPARATUS INCLUDING A MULTI-SECTION DIFFRACTIVE ELEMENT

(75) Inventor: Masaki Arai, Shizuoka (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 11/550,111

(22) Filed: Oct. 17, 2006

(65) Prior Publication Data

US 2007/0133374 A1    Jun. 14, 2007

(30) Foreign Application Priority Data

Oct. 25, 2005    (JP) .............................. 2005-310398

(51) Int. Cl.
*G11B 7/00* (2006.01)
(52) U.S. Cl. .............................. 369/112.05; 369/44.37; 369/112.07
(58) Field of Classification Search ........................ None
See application file for complete search history.

(56) References Cited

U.S. PATENT DOCUMENTS

| 5,886,964 | A | 3/1999 | Fujita | |
|---|---|---|---|---|
| 6,873,589 | B2 * | 3/2005 | Nakao | 369/112.03 |
| 2003/0012092 | A1 * | 1/2003 | Katayama | 369/44.23 |
| 2004/0081064 | A1 | 4/2004 | Ohnishi et al. | |

FOREIGN PATENT DOCUMENTS

| JP | 3549301 | 4/2004 |
|---|---|---|
| JP | 2004-145915 | 5/2004 |

* cited by examiner

*Primary Examiner*—Hoa T Nguyen
*Assistant Examiner*—Emily Frank
(74) *Attorney, Agent, or Firm*—Oblon, Spivak, McClelland, Maier & Neustadt, L.L.P.

(57) ABSTRACT

An optical pickup including: a light source; a diffractive element; an objective lens; and a photodetector, wherein the diffractive element has first to fourth areas provided with a predetermined periodic structure in each of the areas, the second and third areas have phases of the periodic structures of the second and third areas varied at an angle of about 180 degrees, the first area has a phase of the periodic structure in the first area varied from a phase of the periodic structure in the second area at an angle of about 180 degrees, and the fourth area has a phase of the periodic structure in the fourth area varied from a phase of the periodic structure in the third area at an angle of about 180 degrees. The optical pickup can obtain an excellent tracking error signal and improved amplitude when the objective lens is displaced.

12 Claims, 26 Drawing Sheets

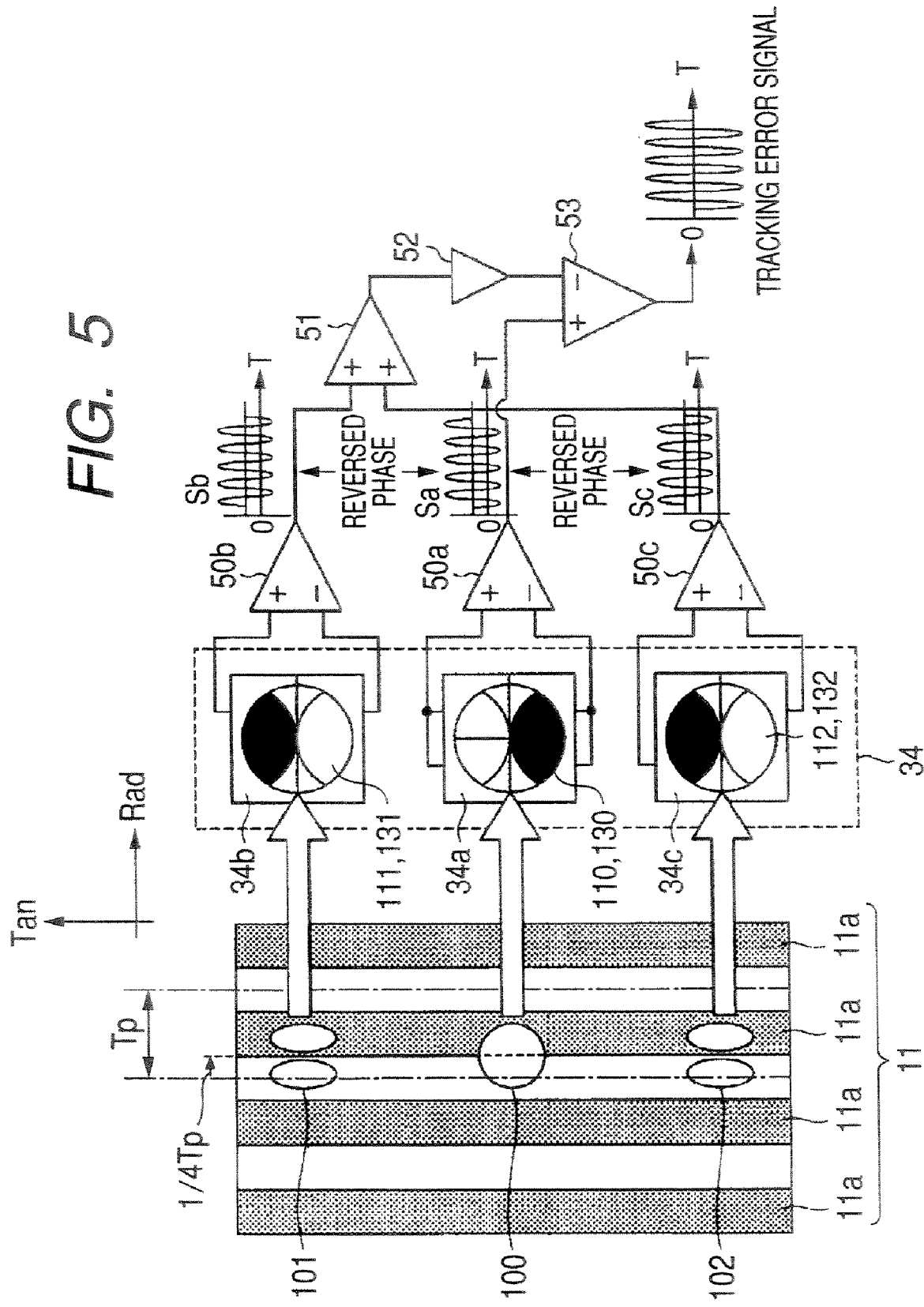

MAIN SPOT

SUB-SPOT WITH NO OBJECTIVE LENS DISPLACEMENT

SUB-SPOT WITH OBJECTIVE LENS DISPLACEMENT

BACKGROUND ART

BACKGROUND ART

BACKGROUND ART 225a   225b

BACKGROUND ART

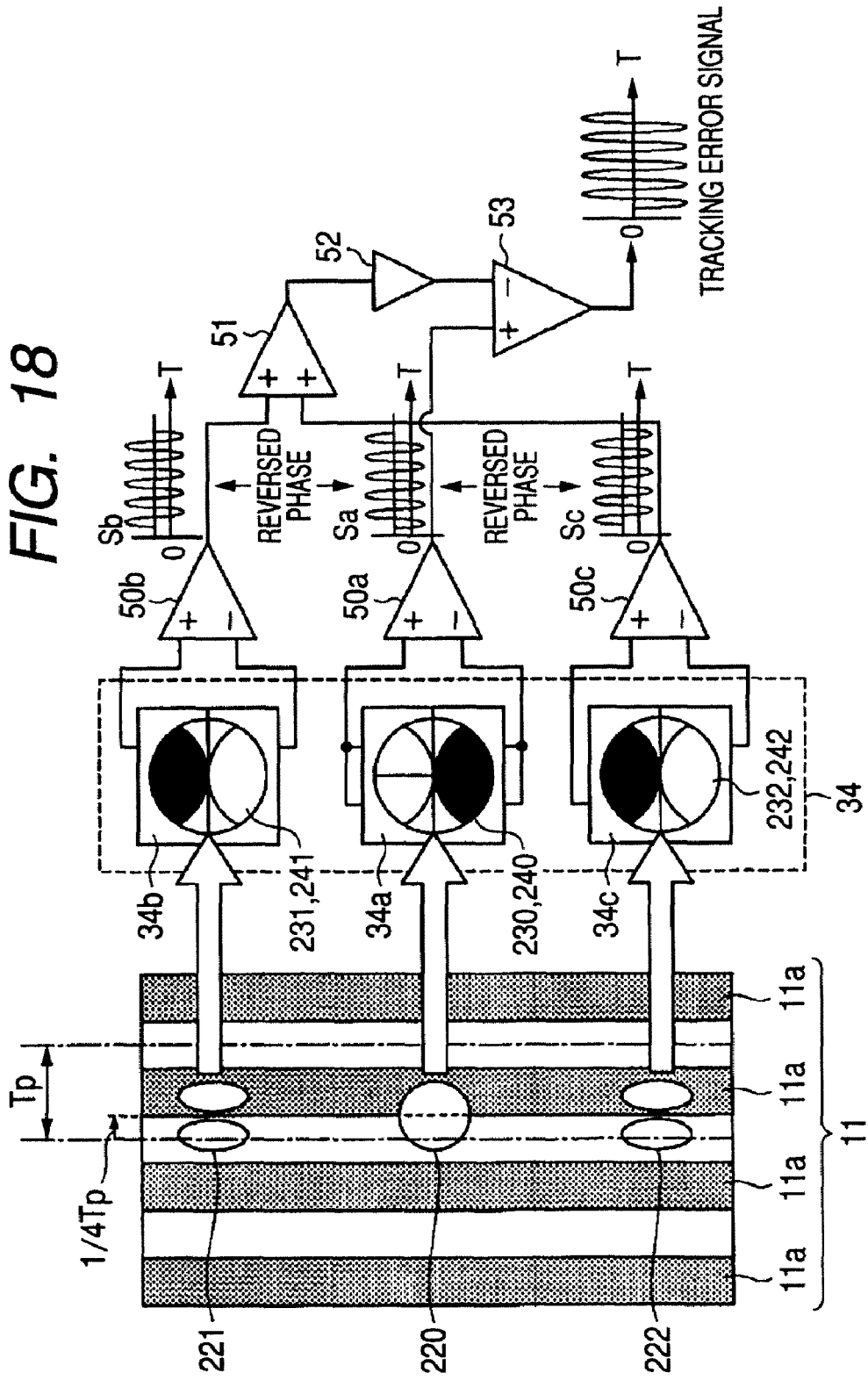

BACKGROUND ART

BACKGROUND ART

BACKGROUND ART

BACKGROUND ART

BACKGROUND ART

BACKGROUND ART

BACKGROUND ART

US 7,706,236 B2

OPTICAL PICKUP AND OPTICAL DISC APPARATUS INCLUDING A MULTI-SECTION DIFFRACTIVE ELEMENT

CROSS REFERENCES TO RELATED APPLICATIONS

The present invention contains subject matter related to Japanese Patent Application JP 2005-310398 filed in the Japanese Patent Office on Oct. 25, 2005, the entire contents of which being incorporated herein by reference.

BACKGROUND OF THE INVENTION

1. Field of the Invention

The present invention relates to an optical pickup and an optical disc apparatus which record and/or reproduce information from an information recording medium such as an optical disc.

2. Description of the Related Art

In order to record and/or reproduce information from an information recording medium such as an optical disc by an optical pickup, it is necessary to correctly apply a convergence spot onto a predetermined recording track on the optical disc.

In order to correctly apply the convergence spot onto the recording track on the optical disc, a differential push-pull method (hereinafter, it is called a "conventional DPP method") is traditionally widely used as a means for detecting a tracking error signal.

An optical pickup using the conventional DPP method has a light source which emits a light beam of a predetermined wavelength, and an objective lens which converges the light beam emitted from the light source onto the signal recording surface of an optical disc 11, in which between the light source and the objective lens, a diffractive element 205 is disposed which has a grating pattern with a projected and recessed pattern as shown in FIG. 14, and the diffractive element 205 splits the light beam emitted from the light source into three light beams formed of a zero order diffracted beam and positive and negative first order diffracted beams.

As shown in FIG. 15, these three light beams are converged into the objective lens to form three convergence spots having a main spot 200 which is formed by converging the zero order diffracted beam onto the optical disc 11 and first and second sub-spots 201 and 202 which are formed by converging the positive and negative first order diffracted beams.

As shown in FIG. 15, the first and second sub-spots 201 and 202 are converged at a position shifted by ½ Tp relatively in the track pitch direction (the tracking direction) of the optical disc 11 with respect to the main spot 200 (here, Tp represents a track pitch).

Then, the wavefront shape and the light intensity distribution of the spots 210 and 211 on light receiving surfaces 34a and 34b of a photodetector which detects the returning light from the optical disc 11 area shown in FIGS. 16A to 16D, and the light and dark conditions of a main spot 210 and a sub-spot 211 are inverted, the main spot 210 is received on the light receiving surface which receives the zero order diffracted beam reflected at the main spot 200 on the optical disc 11 and the sub spot 211 is received on the light receiving surface which receives the positive first order diffracted beam reflected at the first sub-spot 201. In addition, the light and dark conditions of a sub-spot 212 are the same as those of the sub-spot 211, the sub-spot 212 is received on a light receiving surface 34c which receives the negative first order diffracted beam reflected at the second sub-spot 202 on the optical disc 11. Therefore, the push-pull operation output of the main spot 210 on the light receiving surface and the push-pull operation outputs of the sub-spots 211 and 212 on the light receiving surface are differentially operated to obtain a tracking error signal.

However, in the optical pickup according to the conventional DPP method, as described above, it is necessary to set the spacing between the main spot 200 and the first and second sub-spots 201 and 202 on the optical disc 11 in the tracking direction to about one half of the track pitch Tp. Thus, there is a problem that an excellent tracking error signal may not be obtained from optical discs 11 having different track pitches, for example, a DVD±R disc and a DVD-RAM disc.

In order to solve the problem, Japanese patent No. 3549301 and JP-A-2004-145915 (Patent References 1 and 2) describe a method which can obtain a tracking error signal from optical discs having different track pitches (hereinafter, it is called an "in-line DPP method").

An optical pickup using the method described in Japanese patent No. 3549301 (hereinafter, it is called a "two area in-line DPP method") has a two area diffractive element 225 which is split into two areas 225a and 225b as shown in FIG. 17, in which the diffractive element 225 splits a light beam emitted from a light source into three light beams formed of a zero order diffracted beam and positive and negative first order diffracted beams. In addition, the phases of the periodic structures of the first and second areas 225a and 225b of the diffractive element 225 are formed to be varied at an angle of 180 degrees.

As shown in FIG. 18, the three light beams split by the diffractive element 225 are converged into the objective lens to form three convergence spots formed of a main spot 220, a first sub-spot 221 and a second sub-spot 222 on an optical disc 11. As shown in FIG. 18, the first and second sub-spots 221 and 222 are arranged on the same track as the main spot 220.

As described above, since the phases of the periodic structures of the first and second areas 225a and 225b of the diffractive element 225 are varied at an angle of 180 degrees, even though the three convergence spots 220, 221 and 222 are arranged on the same track as shown in FIG. 18, the wavefront shape and the light intensity distribution of light spots 230, 231 and 232 on a photodetector area shown in FIGS. 19A to 19D, and the light and dark conditions of the main spot 230 and the sub-spots 231 and 232 on the light receiving surface are inverted. In addition, FIGS. 19C and 19D show the light intensity distribution and the wavefront shape of the sub-spot 231 on the light receiving surface which receives the positive first order diffracted beam, and the light and dark conditions of the sub-spot 232 on the light receiving surface which receives the negative first order diffracted beam are also the same.

Therefore, a tracking error signal can be obtained by an identical operation with that of the conventional DPP method with the three convergence spots 220, 221 and 222 arranged on the same track. Thus, an excellent tracking error signal can be obtained from each of the optical discs having different track pitches.

However, in the optical pickup according to the two area in-line DPP method, there is a problem that the displacement of the objective lens is displaced to greatly decrease the push-pull operation outputs of the sub-spots 231 and 232 on the light receiving surface. This is because the objective lens is displaced to make the light intensity distribution and the wavefront shape of the sub-spot 231 as shown in FIGS. 20A and 20B, generating an area in which the light and dark conditions are identical with those of the main spot 230. In addition, for the sub-spot 232, its light and dark conditions are similarly varied as those of the sub-spot 231.

On the other hand, in an optical pickup according to the method described in JP-A-2004-145915 (hereinafter, it is called a "three area in-line DPP method"), a three area diffractive element 245 is used which is split into three areas as shown in FIG. 21 in order to solve the problem of the two area in-line DPP method described above. More specifically, the diffractive element 245 has first to third diffraction areas 245a, 245b and 245c in which the phases of the periodic structures of the first and third diffraction areas 245a and 245c are varied at an angle of 180 degrees as similar to the two area type as described above, but the phase of the periodic structure of the second diffraction area 245b arranged between the first and third diffraction areas 245a and 245c is varied at an angle of 90 degrees with respect to the first and third diffraction areas 245a and 245c each.

The diffractive element 245 splits the light beam emitted from the light source into three light beams formed of a zero order diffracted beam and positive and negative first order diffracted beams. As similar to the case according to the two area in-line DPP method shown in FIG. 18, the three split light beams form three convergence spots formed of a main spot 220, a first sub-spot 221 and a second sub-spot 222 converged onto the optical disc 11 by an objective lens.

As described above, the second area 245b is arranged between the first and third areas 245a and 245c, whereby the wavefront shape and the light intensity distribution of a sub-spot 241 on the light receiving surface which receives the positive first order diffracted beam area shown in FIGS. 22A and 22B, and the sub-spot 241 has an area in which the light and dark conditions are halfway inverted with respect to the main spot 240, that is, it has an area of an intermediate condition between the light part and the dark part. In addition, the light intensity distribution and the wavefront shape of the main spot 240 are the same as those of the main spot 230 shown in FIG. 19A as described above. Moreover, the light and dark conditions of a sub-spot 242 on the light receiving surface which receives the negative first order diffracted beam are the same as those of the sub-spot 241.

In the optical pickup according to the three area in-line DPP method, when a displacement of the objective lens is equal to or below a predetermined amount $\Delta X_1$, as shown in FIGS. 23A and 23B, the ratio of the semi-inverse area of the sub-spot 241 on the light receiving surface is increased, but such an area is not generated that the light and dark conditions are identical with those of the main spot 240.

In the optical pickup according to the three area in-line DPP method, because of the existence of the semi-inverse area, the push-pull operation outputs of the sub-spots 241 and 242 drop, but a decrease is smaller than that in the case having an area in which the light and dark conditions are identical with those of the main spot 240. Thus, a tracking error signal can be obtained that the characteristics of the field of view are more excellent than that by the two area in-line DPP method.

However, the optical pickup according to the three area in-line DPP method has the following problem. More specifically, as shown in FIGS. 24A and 24B, under the condition in which a displacement of the objective lens is $\Delta X_2$ that is greater than a predetermined amount ($\Delta X_1$), an area having the light and dark conditions identical with those of the main spot 240 is generated in the sub-spot 241 on the light receiving surface. Therefore, when a displacement of the objective lens is equal to or greater than a predetermined amount $\Delta X_1$, a decrease of push-pull computation outputs of the sub-spots 241 and 242 is almost the same as that of the two area in-line DPP method. In the three area in-line DPP method, in order to increase a displacement of the objective lens at which the first and second sub-spots 241 and 242 begin to have an area in which the light and dark conditions are identical with those of the main spot 240, it is sufficient that the width of the second area 245b of the diffractive element 245 is increased. However, on the other hand, when the width of the second area 245b is increased, a problem arises that the push-pull operation output of the sub-spot on the light receiving surface drops under the condition that the objective lens is not displaced.

More specifically, in the three area in-line DPP method, when the suppression of the decrease in tracking error is as well intended in the range of a wide displacement of the objective lens, a problem arises that the signal-to-noise ratio of the tracking error signal itself is deteriorated.

SUMMARY OF THE INVENTION

It is desirable to provide an optical pickup and an optical disc apparatus which can improve a deterioration in the amplitude of a tracking error signal when the objective lens is displaced and can obtain an excellent tracking error signal.

An optical pickup according to an embodiment of the invention is an optical pickup including: a light source which emits a light beam of a predetermined wavelength; a diffractive element which splits the light beam emitted from the light source into at least three light beams; an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are varied at an angle of about 180 degrees, the first area is arranged on the opposite side of the third area adjacently to the second area wherein a phase of the periodic structure in the first area is varied from a phase of the periodic structure in the second area at an angle of about 180 degrees, and the fourth area is arranged on the opposite side of the second area adjacently to the third area wherein a phase of the periodic structure in the fourth area is varied from a phase of the periodic structure in the third area at an angle of about 180 degrees.

Moreover, an optical pickup according to an embodiment of the invention is an optical pickup including: a light source which emits a light beam of a predetermined wavelength; a diffractive element which splits the light beam emitted from the light source into at least three light beams; an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are varied at an angle of about 180 degrees, the first area is arranged on the opposite side of the third area adjacently to the second area, and a phase of the periodic structure in the first area is varied from a phase of the periodic structure in the second area at an angle of about 90 degrees, and the fourth area is arranged on the opposite side of the second area adjacently to the third area, and a phase of the periodic structure in the fourth area is varied from a phase of the periodic structure in the third area at an angle of about 90 degrees.

An optical disc apparatus according to an embodiment of the invention is an optical disc apparatus including: an optical pickup which records and/or reproduces information from an optical disc; and a disc rotating and driving unit which rotates the optical disc, wherein the optical pickups above are used as an optical pickup for this optical disc apparatus.

According to an embodiment of the invention, three light beams split by the diffractive element provided with the first to fourth areas having a predetermined periodic structure are separately converged onto the signal recording surface of the optical disc, each of the reflected beams is received on the light receiving surface of the photodetector, whereby an excellent tracking error signal can be obtained, and a deterioration in the amplitude of a tracking error signal can be improved when the objective lens is displaced.

BRIEF DESCRIPTION OF THE DRAWINGS

FIG. 4A shows a diagram depicting the wavefront shape when the sum of the widths of a second area and a third area of the diffractive element is smaller than the objective lens pupil diameter, and FIG. 4B shows a diagram depicting the wavefront shape when the sum of the widths of the second area and the third area of the diffractive element is equal to the objective lens pupil diameter;

FIG. 5 shows a plan view depicting the arrangement of convergence spots on an optical disc by the optical pickup to which an embodiment of the invention is adapted, and shows a circuit diagram schematically depicting a detecting system by spots on light receiving surfaces;

FIGS. 6A to 6D illustrate spots detected by a photodetector, spots formed by light beams that are diffracted by the diffractive element of the optical pickup to which an embodiment of the invention is adapted, in which FIG. 6A shows a plan view depicting the light intensity distribution of a main spot on the light receiving surface on which a main beam is converged, FIG. 6B shows a diagram depicting the phase distribution of each of the wavefronts of the main spot, FIG. 6C shows a plan view depicting the light intensity distribution of a sub-spot on the light receiving surface on which a first sub-beam is converged, and FIG. 6D shows a diagram depicting the phase distribution of each of the wavefronts of the sub-spot;

FIGS. 7A and 7B illustrate a spot detected by the photodetector, the spot formed by light beams that are diffracted by the diffractive elements when the objective lens of the optical pickup to which an embodiment of the invention is adapted is displaced, wherein FIG. 7A shows a plan view depicting the light intensity distribution of a sub-spot on the light receiving surface on which a first sub-beam is converged, and FIG. 7B shows a diagram depicting the phase distribution of each of the wavefronts of the sub-spot;

FIGS. 9A and 9B illustrate the wavefront shapes of a first sub-beam on the objective lens pupil separated by another exemplary diffractive element shown in FIG. 8, wherein FIG. 9A shows a diagram depicting the wavefront shape when the sum of the widths of a second area and a third area of the diffractive element is smaller than the objective lens pupil diameter, and FIG. 9B shows a diagram depicting the wavefront shape when the sum of the widths of the second area and the third area of the diffractive element is equal to the objective lens pupil diameter;

FIGS. 10A and 10B illustrate a spot detected by a photodetector, the spot formed by light beams that are diffracted by another exemplary diffractive element shown in FIG. 8, wherein FIG. 10A shows a plan view depicting the light intensity distribution of a sub-spot on the light receiving surface on which a first sub-beam is converged, and FIG. 10B shows a diagram depicting the phase distribution of each of the wavefronts of the sub-spot;

FIGS. 11A and 11B illustrate a spot detected by the photodetector, the spot formed by light beams that are diffracted by the diffractive element when the objective lens of the optical pickup using another exemplary diffractive element shown in FIG. 8 is displaced, wherein FIG. 11A shows a plan view depicting the light intensity distribution of a sub-spot on the light receiving surface on which a first sub-beam is converged, and FIG. 11B shows a diagram depicting the wavefront shape of the sub-spot;

FIGS. 12A and 12B show diagrams depicting the characteristics of the field of view of the range of the DPP signal amplitude with respect to various discs by representing changes in the range of the DPP signal amplitude with respect to a displacement of objective lenses of an optical pickup according to Example 1 and optical pickups according to comparative examples, wherein FIG. 12A shows a diagram depicting the characteristics of the field of view for a DVD-RAM disc, and FIG. 12B shows a diagram depicting the characteristics of the field of view for a DVD±R disc;

FIGS. 13A and 13B show diagrams depicting the characteristics of the field of view of the range of the DPP signal amplitude with respect to various discs by representing changes in the range of the DPP signal amplitude with respect to a displacement of the objective lenses of an optical pickup according to Example 2 and optical pickups according to comparative examples, wherein FIG. 13A shows a diagram depicting the characteristics of the field of view for a DVD-RAM disc, and FIG. 13B shows a diagram depicting the characteristics of the field of view for a DVD±R disc;

FIGS. 16A to 16D illustrate spots detected by a photodetector, the spots formed by light beams that are diffracted by the diffractive element of the optical pickup according to the conventional DPP method, wherein FIG. 16A shows a plan view depicting the light intensity distribution of a main spot on the light receiving surface on which a zero order diffracted beam is converged, FIG. 16B shows a diagram depicting the phase distribution of each of the wavefronts of the main spot, FIG. 16C shows a plan view depicting the light intensity distribution of a sub-spot on the light receiving surface on which a positive first order diffracted beam is converged, and FIG. 16D shows a diagram depicting the phase distribution of each of the wavefronts of the sub-spot;

FIG. 18 shows a plan view depicting the arrangement of the convergence spots according to the two area in-line DPP method, and shows a circuit diagram schematically depicting a detecting system by the spots on the light receiving surfaces;

FIGS. 19A to 19D illustrate spots detected by a photodetector, the spots formed by light beams that are diffracted by the diffractive element of the optical pickup according to the two area in-line DPP method, wherein FIG. 19A shows a plan view depicting the light intensity distribution of a main spot on the light receiving surface on which a zero order diffracted beam is converged, FIG. 19B shows a diagram depicting the phase distribution of each of the wavefronts of the main spot, FIG. 19C shows a plan view depicting the light intensity distribution of a first sub-spot on the light receiving surface on which a positive first order diffracted beam is converged, and FIG. 19D shows a diagram depicting the phase distribution of each of the wavefronts of the first sub-spot;

FIGS. 20A and 20B illustrate a sub-spot detected by a photodetector, the sub-spot formed by the light beams that are diffracted by the diffractive element when an objective lens of the optical pickup according to the two area in-line DPP method is displaced, wherein FIG. 20A shows a plan view depicting the light intensity distribution of the sub-spot on the light receiving surface on which a positive first order diffracted beam is converged, and FIG. 20B shows a diagram depicting the phase distribution of each of the wavefronts of the sub-spot;

FIG. 22A shows a plan view depicting the light intensity distribution of the sub-spot on the light receiving surface on which the positive first order diffracted beam is converged, and FIG. 22B shows a diagram depicting the phase distribution of each of the wavefronts of the sub-spot;

FIGS. 23A and 23B illustrate a sub-spot detected by a photodetector, the sub-spot formed by the light beams that are diffracted by the diffractive element when an objective lens of the optical pickup according to the three area in-line DPP method is displaced by a predetermined amount $\Delta X_1$, wherein FIG. 23A shows a plan view depicting the light intensity distribution of the sub-spot on the light receiving surface on which a positive first order diffracted beam is converged, and FIG. 23B shows a diagram depicting the phase distribution of each of the wavefronts of the sub-spot; FIG. 24A shows a plan view depicting the light intensity distribution of the sub-spot on the light receiving surface on which a positive first order diffracted beam is converged, and FIG. 24B shows a diagram depicting the phase distribution of each of the wavefronts of the sub-spot.

DETAILED DESCRIPTION OF THE INVENTION

Hereinafter, an optical disc apparatus using an optical pickup to which an embodiment of the invention is adapted will be described with reference to the drawings.

An optical disc apparatus 10 is a recording/reproducing apparatus which can record and/or reproduce an information signal from an optical disc 11.

For example, the optical disc 11 used here is optical discs such as a CD (Compact Disc), a DVD (Digital Versatile Disc), and a CD-R (Recordable) and a DVD-R (Recordable) that can record information, and a CD-RW (Rewritable), a DVD-RW (Rewritable), a DVD+RW (Rewritable), and a DVD-RAM (Random Access Memory) that can rewrite information, a high-density recording optical disc that uses a semiconductor laser having a short light emission wavelength of about 405 nm (bluish-violet) and that can perform high-density recording, and a magneto-optical disc.

Figure 1:
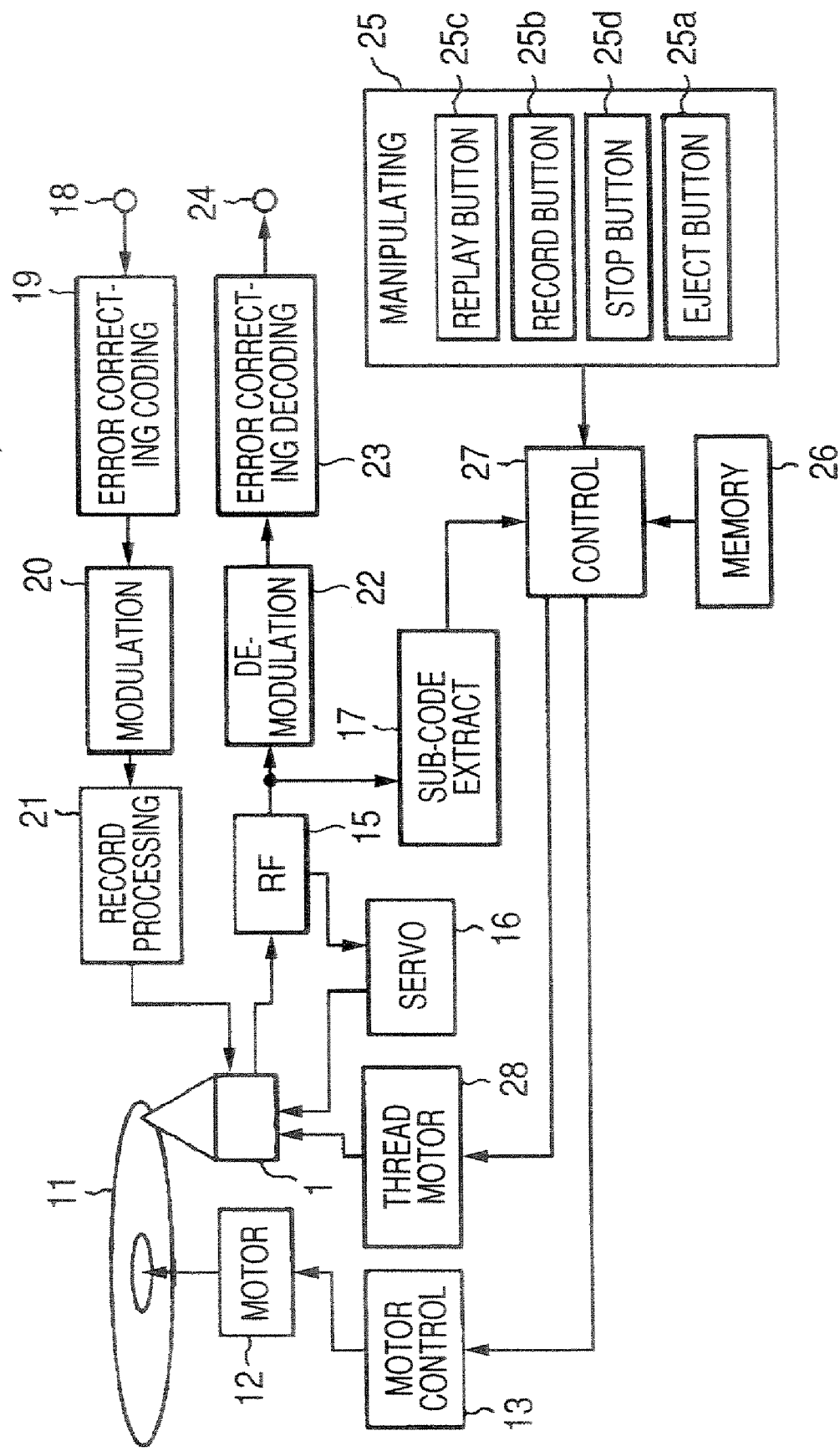
FIG. 1 shows a block circuit diagram depicting the configuration of an optical disc apparatus to which an embodiment of the invention is adapted.

As shown in FIG. 1, the optical disc apparatus 10 has a spindle motor 12 as a driving unit which rotates the optical disc 11, a motor control circuit 13 which controls the spindle motor 12, an optical pickup 1 which applies a light beam onto the optical disc 11 rotated by the spindle motor 12 and detects a returning light beam reflected at the optical disc 11, an RF amplifier 15 which amplifies an electric signal outputted from the optical pickup 1, a servo circuit 16 which generates a focusing servo signal and a tracking servo signal of an objective lens, and a sub-code extract circuit 17 which extracts sub-code data.

Moreover, as a recording system, the optical disc apparatus 10 has an input terminal 18 which is connected to a host device such as a personal computer and to which data for recording is inputted, an error correcting coding circuit 19 which applies error correcting coding processing to the recorded data that is inputted to the input terminal 18, a modulation circuit 20 which modulates data after error correcting coding processing, and a record processing circuit 21 which applies recording processing to the modulated recorded data.

Furthermore, as a reproduction system, the optical disc apparatus 10 has a demodulation circuit 22 which demodulates the reproduced data read out of the optical disc 11, an error correcting decoding circuit 23 which applies error correcting decoding processing to the demodulated reproduced data, and an output terminal 24 which outputs data after error correcting decoding processing. Furthermore, the optical disc apparatus 10 has a manipulating part 25 which enters a manipulation signal to the apparatus, a memory 26 which stores various items of control data therein, and a control circuit 27 which controls the operation of the overall apparatus. Furthermore, the optical disc apparatus 10 has a thread motor 28 which is a drive source when the optical pickup 1 is moved in the diameter direction of the optical disc 11 which is mounted on a disc table.

The spindle motor 12 is provided with the disc table in which the optical disc 11 is mounted on the spindle, and the motor rotates the optical disc 11 mounted on the disc table. The motor control circuit 13 drive controls the spindle motor 12 so as to rotate the optical disc at CLV (Constant Linear Velocity). More specifically, the motor control circuit 13 drive controls the spindle motor 12 so that the rotation speed of the optical disc 11 is almost constant based on a reference clock from a crystal oscillator and a clock from a PLL circuit.

In addition, the optical disc 11 may be rotated under control at CAV (Constant Angular Velocity) or the combination of CLV with CAV.

The optical pickup 1 has a light source such as a semiconductor laser which emits a predetermined wavelength of a light beam, an objective lens which converges the light beam emitted from the light source, a photodetector which detects the returning light beam reflected at the optical disc 11, etc. When the optical pickup 1 reads out data recorded on the optical disc 11, it sets the power of the semiconductor laser at a normal level to allow a semiconductor laser to emit a light beam that is a laser beam. Moreover, when the optical pickup 1 records data to be recorded on the optical disc 11, it sets the power of the semiconductor laser at a higher recording level than a normal level when reproduced, and allows the semiconductor laser to emit a light beam that is a laser beam. When the optical pickup 1 records and reproduces data, it applies a light beam onto the optical disc 11, and it detects the returning light beam reflected in the signal recording surface by the photodetector for photoelectric conversion. Moreover, the objective lens is held in an objective lens drive mechanism such as a two axial actuator, it is driven and displaced in the focusing direction in parallel with the optical axis of the objective lens based on the focusing servo signal, as well as it is driven and displaced in the tracking direction orthogonal to the optical axis of the objective lens based on the tracking servo signal. In addition, the configuration of the optical system including the semiconductor laser, the objective lens and the photodetector will be described later in detail.

The RF amplifier 15 generates an RF signal, focusing error signal and the tracking error signal based on an electric signal from the photodetector configuring the optical pickup 1. For example, focusing error signal is generated by an astigmatism method, and the tracking error signal is generated as described later. In reproduction, the RF amplifier 15 outputs the RF signal to the demodulation circuit 22, and outputs the focusing error signal and the tracking error signal to the servo circuit 16.

The servo circuit 16 generates a servo signal when the optical disc 11 is replayed. More specifically, the servo circuit 16 generates the focusing servo signal so that the focusing error signal is zero based on the focusing error signal inputted from the RF amplifier 15, and it generates the tracking servo signal so that the tracking error signal is zero based on the tracking error signal inputted from the RF amplifier 15. Then, the servo circuit 16 outputs the focusing servo signal and the tracking servo signal to a drive circuit of the objective lens drive mechanism configuring the optical pickup 1. The drive circuit drives the two axial actuator based on the focusing servo signal, it drives and displaces the objective lens in the focusing direction in parallel with the optical axis of the objective lens, it drives the two axial actuator based on the tracking servo signal, and it drives and displaces the objective lens in the tracking direction orthogonal to the optical axis of the objective lens.

The optical disc apparatus 10 thus configured operates the spindle motor 12 to drive the optical disc 11, drive controls the thread motor 28 in accordance with the control signal from the servo circuit 16, and moves the optical pickup 1 at the position corresponding to a desired recording track on the optical disc 11, whereby information is recorded and reproduced from the optical disc 11.

Next, the optical pickup 1 to which an embodiment of the invention is adapted will be described.

Hereinafter, the optical pickup 1 will be discussed as it records and/or reproduces data from the optical disc 11 such as a DVD-RAM and a DVD-R on which a guide groove 11a is formed at regular intervals. However, it is not limited thereto, which can record and/or reproduce data from various optical discs as described above.

Figure 2:
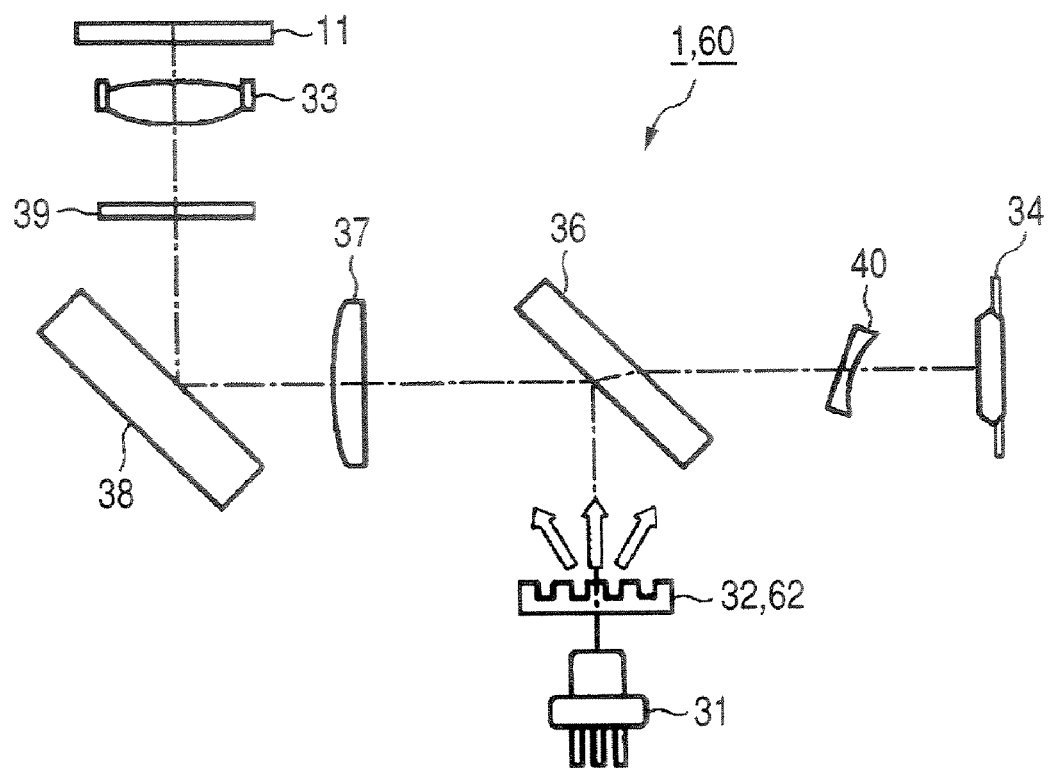
FIG. 2 shows an optical path diagram depicting an optical system of an optical pickup to which an embodiment of the invention is adapted.

As shown in FIG. 2, the optical pickup to which an embodiment of the invention is adapted has a light source 31 which emits a predetermined wavelength of a light beam, a diffractive element 32 which diffracts the light beam emitted from the light source 31 and splits it into three light beams formed of a main beam and first and second sub-beams, an objective lens 33 which converges the three light beams split by the diffractive element 32 onto the signal recording surface of the optical disc 11 and applies three convergence spots onto the signal recording surface, and a photodetector 34 which has a plurality of light receiving surfaces, each of them is split into two or more areas and receives the returning light reflected in the signal recording surface of the optical disc 11.

Moreover, the optical pickup 1 has a beam splitter 36 which is disposed on the optical path between the diffractive element 32 and the objective lens 33 and separates the optical path of the outgoing light beam emitted from the light source 31 from the optical path of the returning light beam reflected in the optical disc 11, a collimator lens 37 which is disposed on the optical path between the beam splitter 36 and the objective lens 33 and forms the incident light beam into parallel rays, a mirror 38 which is disposed on the optical path between the collimator lens 37 and the objective lens 33, reflects the light beam that is formed in the parallel rays by the collimator lens 37 and emits them toward the objective lens side, a ¼ wave plate 39 which is disposed between the mirror 38 and the objective lens 33 and adds a phase difference of a ¼ wavelength to the different polarization components of the transmitting light beam, and a cylindrical lens 40 which is disposed between the beam splitter 36 and the photodetector 34 and generates astigmatism in order to obtain the focusing error signal for the light beam guided on the photodetector 34 side by the beam splitter 36.

The light source 31 is a semiconductor laser, which emits a laser beam having a wavelength of about 650 nm, for example.

The diffractive element 32 diffracts the light beam emitted from the light source 31, and splits it into three light beams in order to obtain a tracking error signal. More specifically, the diffractive element 32 splits the incident light beam into a zero order beam that transmits as it is (hereinafter, it is called a "main beam"), and positive and negative first order diffracted beams (hereinafter, they are called as a "first sub-beam", and a "second sub-beam") that are branched from the main beam at predetermined diffraction angles.

Figure 3:
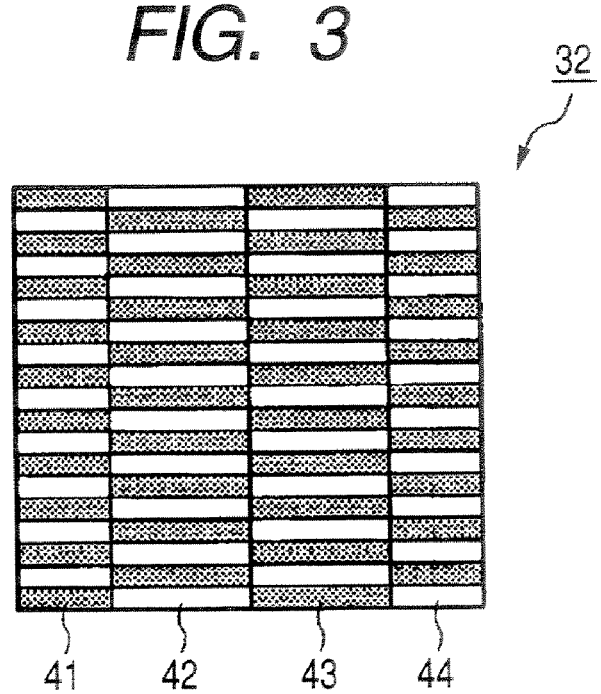
FIG. 3 shows a plan view depicting a diffractive element configuring the optical pickup to which an embodiment of the invention is adapted.

The diffractive element 32 is a diffraction grating which is formed of a transmissive member and has a special grating pattern, in which grating grooves are formed on the grating surface at a predetermined cycle. Then, as shown in FIG. 3, the grating surface is split into at least four areas, first to fourth areas 41, 42, 43 and 44, each area has a projected and recessed pattern in parallel, by the split lines orthogonal in the direction where the grating grooves are formed, that is, the grating surface is split into four areas in the tracking direction (a radial direction $R_{ad}$) In the first to fourth areas 41, 42, 43 and 44, the grating grooves are periodically formed in each area at a predetermined width, having a periodic structure. The grating grooves formed in the adjacent areas are arranged in such a way that they are shifted by about one half of the cycle of the grating grooves, that is, the phase of the grating grooves is shifted at an angle of 180 degrees.

In other words, the diffractive element 32 has the first to fourth areas 41, 42, 43 and 44 each having a predetermined periodic structure in the areas in which the areas are split by the split lines in the tangential direction $T_{an}$ orthogonal to the tracking direction, arranged side by side in the tracking direction. The second and third areas 42 and 43 disposed on the both sides approximately at the central line of the diffractive element 32 are arranged adjacently, and they are formed in such a way that the phases of the periodic structures disposed in the second and third areas 42 and 43 are varied at an angle of 180 degrees. The first area 41 is arranged on the opposite side of the third area 43 adjacently to the second area 42, that is, it is arranged outside the second area 42, and it is formed in such a way that the phase of the periodic structure disposed in the first area 41 is varied at an angle of about 180 degrees with respect to the phase of the periodic structure in the second area 42. The fourth area 44 is arranged on the opposite side of the second area 42 adjacently to the third area 43, that is, it is arranged outside the third area 43, and it is formed in such a way that the phase of the periodic structure disposed in the fourth area 44 is varied at an angle of about 180 degrees with respect to the phase of the periodic structure in the third area 43.

The diffractive element 32 formed in the special pattern like this diffracts and separates the transmitting light beam into at least the main beam and the first and second sub-beams as well as it provides a predetermined modulation to the wavefronts of the lightwaves of the first and second sub-beams.

Figure 4A:
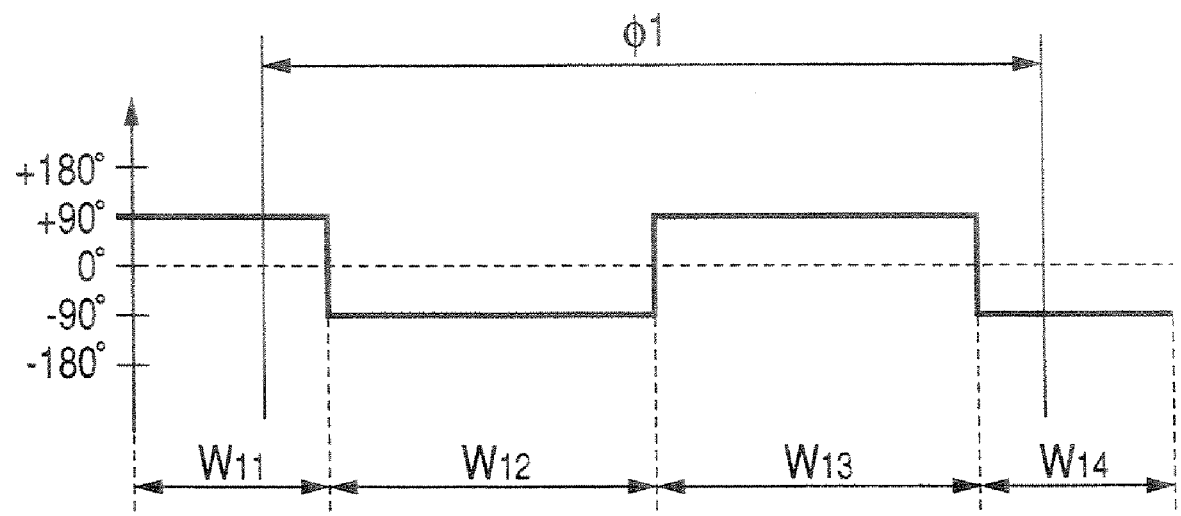
FIGS. 4A and 4B show the wavefront shapes of a first sub-beam on an objective lens pupil separated by the diffractive element of the optical pickup to which an embodiment of the invention is adapted.

For example, as shown in FIG. 4A, the wavefronts of the first sub-beam and the second sub-beam have a projected and recessed wavefront shape in which the wavefront phases are alternately shifted in four stages at an angle of 180 degrees on the objective lens pupil. At this time, among the wavefronts shifted in four stages, widths $W_{12}$ and $W_{13}$ of two areas at the center correspond to the widths of the second and third areas 42 and 43 arranged at the center of the diffractive element 32, respectively. In addition, FIG. 4A and FIG. 4B, described later, show the wavefront shape of the first sub-beam, and the wavefront shape of the second sub-beam has the shape in which the wavefront shape of the positive first order diffracted beam is inverted laterally. More specifically, the wavefronts of the first and second sub-beams have inverted phases to each other, and have the wavefront shapes in inverted projected and recessed shapes. On the other hand, the zero order beam transmitting through the diffractive element 32 unchanged is not affected by the grating pattern.

For example, as shown in FIG. 4A, the diffractive element 32 is formed in such a way that the sum of the width $W_{12}$ of the second area and the width $W_{13}$ of the third area satisfies the following equation (1) in the relation with an objective lens pupil diameter $\phi_1$.

$$W_{12} + W_{13} = \phi_1 \cdot \alpha_1 \quad (1)$$

Figure 4B:
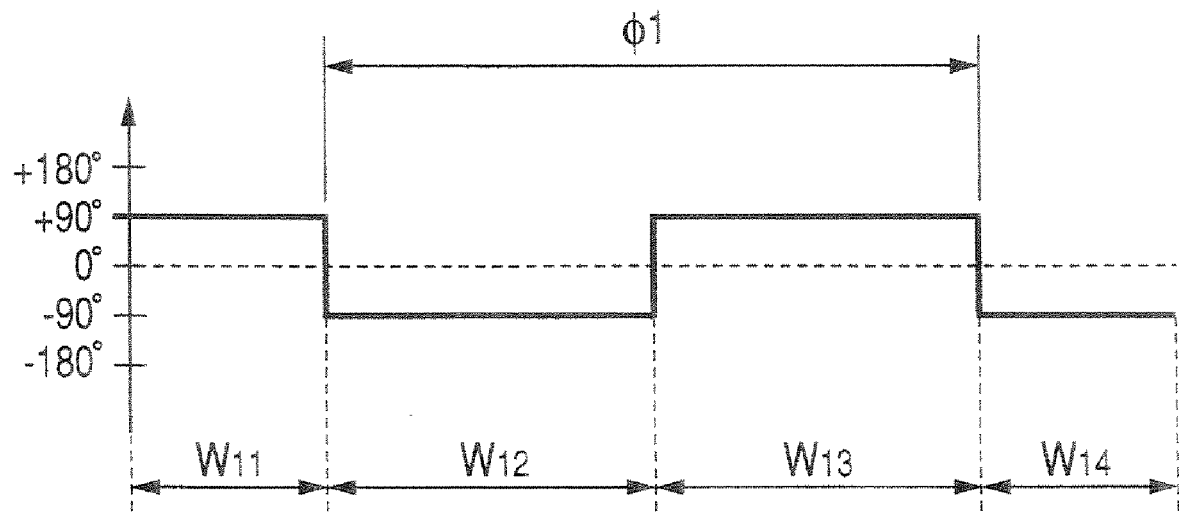

Particularly in the discussion below, as shown in FIG. 4B, $\alpha_1 = 1$, and the discussion will proceed as the sum of the widths $W_{12}$ and $W_{13}$ is equal to the objective lens pupil diameter $\phi_1$, but which is not limited thereto, it is sufficient that $\alpha_1$ is within a predetermined range.

Moreover, the diffractive element 32 is arranged in such a way that three split light beams each pass through the optical components and are converged into the objective lens 33, whereby each of the convergence spots formed on the signal recording surface of the optical disc 11 is applied onto the same track on the optical disc 11, that is, the spacing in the tracking direction is zero, the spacing is orthogonal to the track of each of the convergence spots.

Since the diffractive element 32 thus configured provides to the first and second sub-beams that are three diffracted and separated light beams a projected and recessed wavefront shape in which the wavelengths are alternately shifted in four stages at an angle of 180 degrees, the light intensity distribution (light quantity distribution) of sub-spots 111 and 112 on the light receiving surface of the photodetector can be inverted with respect to the light intensity distribution (light quantity distribution) of a main spot 110 by the main beam on the light receiving surface. Therefore, an excellent tracking error signal can be obtained, and a tracking error signal with no signal deterioration can be obtained even though the objective lens is displaced.

The beam splitter 36 reflects the three light beams split by the diffractive element 32 and guides them on the collimator lens 37 side as well as it passes the returning light beam from the optical disc 11 therethrough and guides it on the cylindrical lens 40 side. The collimator lens 37 emits the incident three light beams as approximate parallel rays. The mirror 38 reflects the light beam formed into the parallel rays by the collimator lens 37, and guides it on the ¼ wave plate 39 side. The ¼ wave plate 39 adds a phase of a ¼ wavelength to the transmitting light beam, which alters the polarized state of the light beam reflected at the mirror 38 from a linearly polarized light to a circular polarized light and emits it on the objective lens 33 side.

The objective lens 33 converges the incident three light beams that have been split by the diffractive element 32, have passed through the beam splitter 36, the collimator lens 37, the mirror 38 and the ¼ wave plate 39 and have entered therein onto the signal recording surface of the optical disc 11, and separately forms three convergence spots on the signal recording surface of the optical disc 11 as shown in FIG. 5. More specifically, the objective lens 33 converges the main beam split by the diffractive element 32 to form a main spot 100, converges the first sub-beam to form a first sub-spot 101, and converges the second sub-beam to form a second sub-spot 102. As described above, the main spot 100 and the first and second sub-spots 101 and 102 are formed in such a way that the spacing in the tracking direction is zero, that is, the three light spots are formed to have an equal positional relation with the guide groove 11a in the tracking direction.

The photodetector 34 is arranged to receive the reflected beams of the three convergence spots 100, 101 and 102 from the optical disc 11 on a plurality of the light receiving surfaces each split into two or more areas. More specifically, the photodetector 34 has a four area light receiving surface 34a which receives the returning light of the main beam and two area light receiving surfaces 34b and 34c which receive the returning lights of the first and second sub-beams, respectively. In the four area light receiving surface 34a, the returning light of the main beam is converged to form the main spot 110 for detection, and in the two area light receiving surfaces 34b and 34c, the returning light of the first and second sub-beams are converged to form the sub-spots 111 and 112 for detection. The photodetector 34 can receive the light beams split into three light beams by the diffractive element 32, and can detect information signals as well as various signals such as a tracking error signal and a focusing error signal.

Then, photoelectric conversion signals from the light receiving surfaces 34a, 34b and 34c are subtracted by subtracters 50a, 50b and 50c, respectively, thereby detecting the tracking error signals of the main spot 110 and the sub-spots 111 and 112 (hereinafter, they are called "push-pull signals Sa, Sb and Sc") according to the push-pull method.

More specifically, the push-pull signals Sa and Sb are outputted in such a way that the signal waveforms thereof have reversed phases to each other. Moreover, the push-pull signals Sa and Sc are outputted in such a way that the signal waveforms thereof have reversed phases to each other. Then, push-pull signals Sb and Sc have the same phase. Therefore, even though the sum signal of the push-pull signals Sb and Sc is subtracted from the push-pull signal Sa, the signal component is not cancelled, on the contrary, it can be amplified.

On the other hand, when the objective lens 33 is displaced or the optical disc 11 is tilted, a predetermined offset component is generated in each of the push-pull signals because of the displacement or the tilt. However, it is clear that the offset component is generated at the same polarity in the push-pull signals Sa, Sb and Sc regardless of the positions of the convergence spots on the signal recording surface of the optical disc 11. Thus, when subtraction processing as described above is performed, only the offset components included in each of the push-pull signals are selectively cancelled to each other, and consequently, an excellent tracking error signal can be detected in which only the offset components are completely removed, or are decreased greatly.

For example, the push-pull signals Sb and Sc shown in FIG. 5 are properly added by an adder 51, the added signal is properly amplified by an amplifier 52, and then it is subtracted from the push-pull signal Sa of the main spot 110 by a subtracter 53. Thus, an excellent tracking error signal is outputted in which the offset component included in the push-pull signal Sa is completely removed, or is decreased greatly and only the amplitude is amplified.

The optical pickup 1 thus configured can highly sensitively detect an excellent tracking error signal in which the offset component is greatly decreased and only the amplitude is amplified regardless of the difference in the track pitch of the optical disc.

Here, the principle of detecting the tracking error signal will be described according to the method in which the three light beams split by the diffractive element 32 are converged onto the optical disc and the positions of the three convergence spots are arranged in such a way that the spacing in the tracking direction is zero, the spacing is orthogonal to the track of the optical disc, like the optical pickup 1 thus configured, a so-called (four area) in-line DPP method.

As described above, when the light beam is diffracted and separated by the diffractive element 32, the first and second sub-beams have in a projected and recessed shape in which the wavefronts are shifted in four stages by one half of the wavelength λ, that is, the phases are alternately shifted to each other at an angle of 180 degrees. The sub-beams are maintained in this state to pass through the collimator lens 37, the mirror 38 and the ¼ wave plate 39, and they are converged onto the signal recording surface of the optical disc 11 by the objective lens 33 to form the first and second sub-spots 101 and 102.

On the other hand, the wavefront of the main beam passing through the diffractive element 32 unchanged is not affected by phase modulation, the main beam passes through the collimator lens 37, the mirror 38 and the ¼ wave plate 39 and enters the objective lens 33 as a pencil of parallel rays having a two-dimensional wavefront. As similar to the first and second sub-beams, it is converged onto the signal recording surface of the optical disc 11 to form the main spot 100.

When the light beams such as the main beam and the first and second sub-beams are converged onto the signal recording surface of the optical disc 11 on which the guide grooves 11a are periodically formed, the reflected returning light beams are diffracted by the guide groove 11a on the optical disc 11, and are separated into at least the zero order beam and the positive and negative first order diffracted beams.

Then, the zero order beam and the positive and negative first order diffracted beams of the main beam and the first and second sub-beams travel as they are overlapped and shifted at a predetermined distance to each other by the objective lens 33, and are converged onto the light receiving surfaces 34a, 34b and 34c of the photodetector 34. In the area in which the zero order beam and the positive and negative first order diffracted beams of the main beam and the sub-beams are overlapped on the light receiving surfaces, due to the interference effect, the light intensity, that is, the light and dark conditions are varied depending on the relative phase shift amount (phase difference) between the zero order beam wavefront and the positive first order diffracted beam wavefront, and between the zero order beam wavefront and the negative first order diffracted beam wavefront. In addition, the wavefront phase difference between the zero order beam wavefront and the positive and negative first order diffracted beam wavefronts are varied depending on the relative position of the convergence spot with respect to the guide groove 11a on the optical disc 11 (the position in the tracking direction). Therefore, the light intensities on the light receiving surfaces 34a, 34b and 34c are varied depending on the relative positions of the convergence spots with respect to the guide groove on the optical disc 11.

Figure 6A:
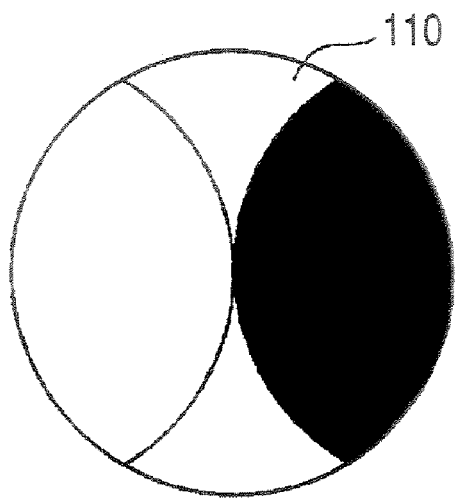
Figure 6B:
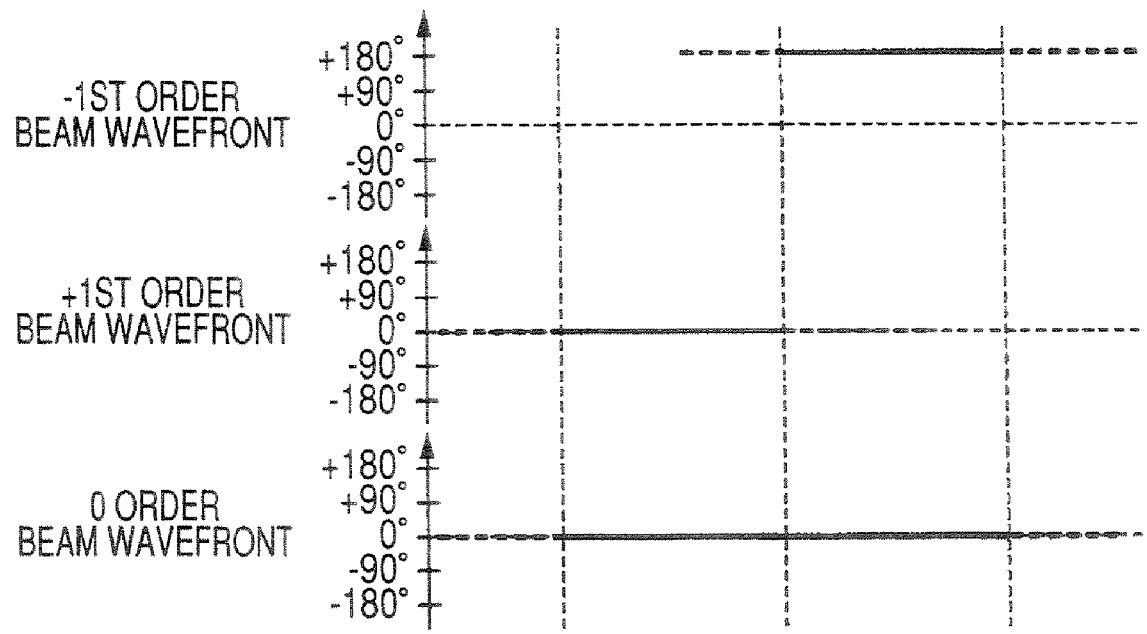
Figure 6C:
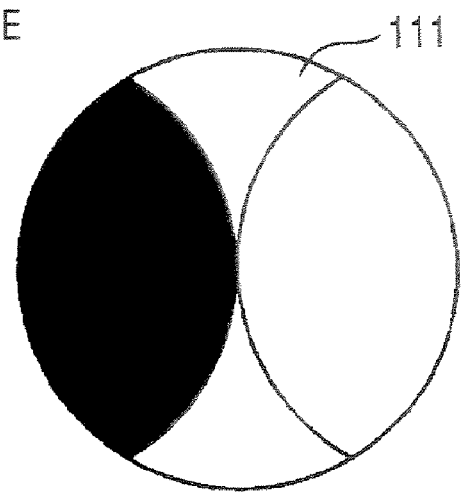
Figure 6D:
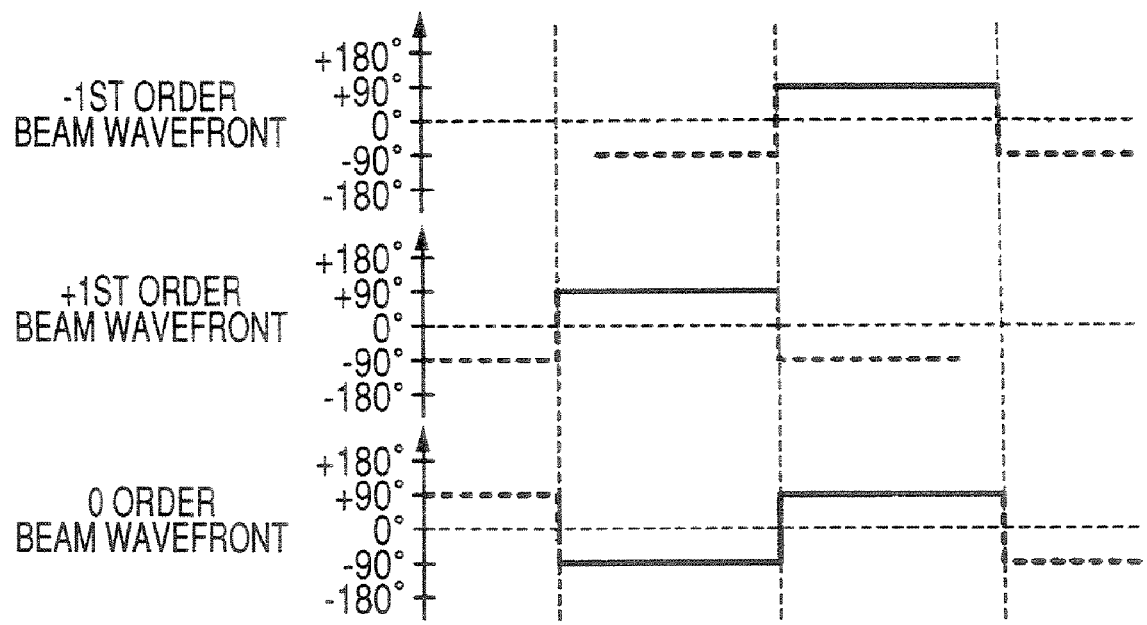

Here, as shown in FIG. 5, FIG. 6A shows the light intensity distribution of the main spot 110 on the light receiving surface 34a of the photodetector 34 when the main spot 100 and the first and second sub-spots 101 and 102 on the signal recording surface of the optical disc 11 are placed at the positions shifted by a quarter of the cycle of the guide groove 11a, and FIG. 6B shows the phase distribution of the zero order beam wavefront and the positive and negative first order beam wavefronts of the main beam at this time. Moreover, FIG. 6C shows the light intensity distribution of the sub-spot 111 on the light receiving surface 34b of the photodetector 34 in the same state, and FIG. 6D shows the phase distribution of the zero order beam wavefront and the positive and negative first order beam wavefronts of the first sub-beam at this time. As shown in FIGS. 6A and 6C, the light intensity distribution of the main spot 110 and the light intensity distribution of the sub-spot 111 are laterally inverted. In addition, the phase distribution of the zero order beam wavefront and the positive and negative first order beam wavefronts of the second sub-beam has a different distribution from that of the first sub-beam shown in FIG. 6D, but the light intensity distribution of the sub-spot 112 on the light receiving surface 34c of the photodetector 34 has the same distribution as that of the light intensity distribution of the sub-spot 111 shown in FIG. 6C.

First, the main spot 110 for detection which the main beam is converged onto the light receiving surface 34a will be described.

As shown in FIG. 5 and in FIG. 6B, in the state in which the main spot 110 reaches the position at which the main spot 100 is shifted by a quarter of the cycle of the guide groove 11a, the positive first order diffracted beam has a phase difference at an angle of zero degree with respect to the zero order beam, the positive first order diffracted beam is one of the wavefronts of the positive and negative first order diffracted beams generated by the guide groove on the optical disc 11, whereas the negative first order diffracted beam, which is the other of them, has a phase difference at an angle of 180 degrees with respect to the zero order beam. Then, the light intensity distribution due to the interference effect generated by the zero order beam and the positive and negative first order diffracted beams diffracted, separated and overlapped with each other on the light receiving surface 34a as they are shifted at a predetermined distance, that is, the light and dark distribution is as shown in FIG. 6A, and the right side portion shown in FIG. 6A is dark which is the area in which the zero order beam and the negative first order diffracted beam having a phase difference at an angle of 180 degrees are overlaid.

In addition, when the main spot 100 on the optical disc 11 is in the guide groove (groove) or in the middle of the guide grooves (on a land), the zero order beam wavefront and the positive and negative first order beam wavefronts generated by the guide groove 11a on the optical disc 11 have a phase difference at an angle of +90 degrees or −90 degrees, but the phase relation between the wavefronts is varied as the main spot 100 is shifted from the position toward in the tracking direction. Then, when it is shifted by a quarter of the cycle, it has the phase relation shown in FIG. 6B described above. On the other hand, when it is shifted by a quarter of the cycle on the opposite side of the position shown in FIG. 5, the relation of the phase difference is laterally inverted, and the light intensity distribution shown in FIG. 6A is also laterally inverted.

Therefore, in the main spot 110, the light and dark conditions in the area in which the positive first order diffracted beam and the zero order beam are overlapped with each other, and in the area in which the negative first order diffracted beam and the zero order beam are overlapped with each other, that is, the light intensity distribution is continuously varied in accordance with the relative positional relation between the convergence spot on the optical disc 11 and the guide groove 11a, and the change is laterally inverted in each of the overlapped areas. Then, the change in the light intensity distribution is detected by a photodetector that is split into at least two in the right and left areas, and the differential signals thereof are outputted to generate a tracking error signal according to a so-called push-pull method.

Next, the sub-spot 111 for detection which the first sub-beam is converged onto the light receiving surface 34b will be described. In addition, the sub-spot 112 for detection which the second sub-beam is converged onto the light receiving surface 34c is almost the same as the sub-spot 111, omitting the detailed description.

As described above, the first sub-beam is formed in a projected and recessed shape in which the wavefronts of the light beams are alternately shifted to each other in four stages at an angle of 180 degrees. The projected and recessed wavefront shape is still maintained even though it reflects in the optical disc 11 and reaches the light receiving surface 34b of the photodetector 34.

Then, as shown in FIG. 5 and in FIG. 6D, in the sub-spot 111, when the first sub-spot 101 on the optical disc 11 reaches the position which is shifted by a quarter of the cycle of the guide groove 11a, the positive first order diffracted beam generated by the guide groove on the optical disc 11 has a phase difference at an angle of 180 degrees with respect to the zero order beam, and the negative first order diffracted beam has a phase difference at an angle of zero degree with respect to the zero order beam. Then, the light intensity distribution due to the interference effect generated by the zero order beam and the positive and negative first order diffracted beams which are diffracted, separated, and overlapped with each other on the light receiving surface 34b as they are shifted at a predetermined distance, that is, the light and dark distribution is as shown in FIG. 6C, and the left side portion shown in FIG. 6C is dark which is the area in which the zero order beam and the positive first order diffracted beam having a phase difference at an angle of 180 degrees are overlaid.

In addition, when the first sub-spot 101 is in the guide groove or in the middle of the guide grooves on the optical disc 11, the zero order beam wavefront and the positive and negative first order beam wavefronts generated by the guide groove 11a on the optical disc 11 have the projected and recessed shape described above as well as normally have a phase difference at an angle of +90 degrees or −90 degrees, but the phase relation between the wavefronts is varied as the first sub-spot 101 is shifted from the position toward in the tracking direction. Then, in the state in which it is shifted by a quarter of the cycle, it has the phase relation as shown in FIG. 6D described above.

Therefore, as similar to the case of the main spot 110 as described above, in the sub-spot 111, the light and dark conditions in the area in which the positive first order diffracted beam and the zero order beam are overlapped with each other, and in the area in which the negative first order diffracted beam and the zero order beam are overlapped with each other, that is, the light intensity distribution is continuously varied in accordance with the relative positional relation between the convergence spot on the optical disc 11 and the guide groove 11a, and the change is laterally inverted in each of the overlapped areas. Then, the change in the light intensity distribution is detected by a photodetector that is split into two in the right and left areas, and the differential signals thereof are outputted to generate a tracking error signal according to a so-called push-pull method.

Here, in the sub-spot 111, the first sub-beam is different from the main beam in that it is in a projected and recessed shape in which the wavefronts of the light beams are shifted to each other in four stages at an angle of 180 degrees. Thus, even though the normal phase difference between the wavefronts of the positive and negative first order diffracted beams and the zero order beam decided depending on the relative positional relation between the convergence spot on the optical disc 11 and the guide groove 11a is identical with that of the main beam, the light intensity change in light and dark conditions in the right and left interference areas generated in consequence thereof is varied in the state inverted with respect to the case of the main spot 11, as shown in FIGS. 6A and 6B, for example.

This means that in the case of a so-called "in-line DPP method", that is, even though the relative positions of the main spot 100 and the first and second sub-spots 101 and 102 on the optical disc 11 with respect to the guide groove are identical, that is, the spacing in the tracking direction between the main spot 100 and the first and second sub-spots 101 and 102 is zero, the push-pull signals outputted from the main spot 110 and the sub-spots 111 and 112 on the light receiving surface are completely inverted in the phases of the signal waveforms. More specifically, in the in-line DPP method, as shown in FIG. 5, even though the main spot 100 and the first and second sub-spots 101 and 102 are arranged in such convergence spots that are applied onto the same guide groove at the same time, an excellent tracking error signal can be obtained as similar to the conventional DPP method.

Therefore, the optical pickup to which an embodiment of the invention is adapted can detect an excellent tracking error signal from optical discs having different track pitches all the time.

Next, in a so-called four area in-line DPP method provided with the diffractive element 32 having four area split in the tracking direction, like the optical pickup 1 thus configured, the changes in the light intensity distribution of each of the spots on the light receiving surface will be discussed when the objective lens 33 is displaced in the tracking direction.

Figure 17:
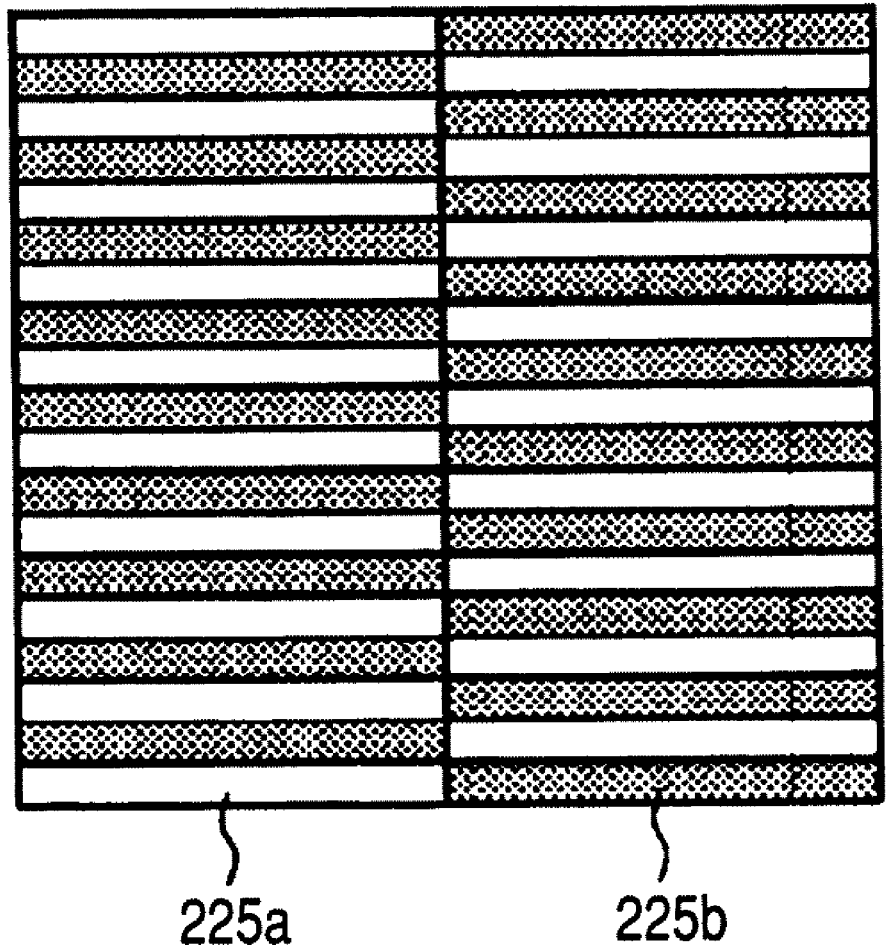
FIG. 17 shows a plan view depicting a diffractive element configuring an optical pickup according to the two area in-line DPP method.

First, prior to describing the optical pickup to which an embodiment of the invention is adapted, for a comparative example, in an optical pickup according to the two area in-line DPP method provided with the diffractive element 225 having two areas 225a and 225b shown in FIG. 17, the change in the light intensity distribution of the spot on the light receiving surface will be described when the objective lens is displaced.

Figure 19A:
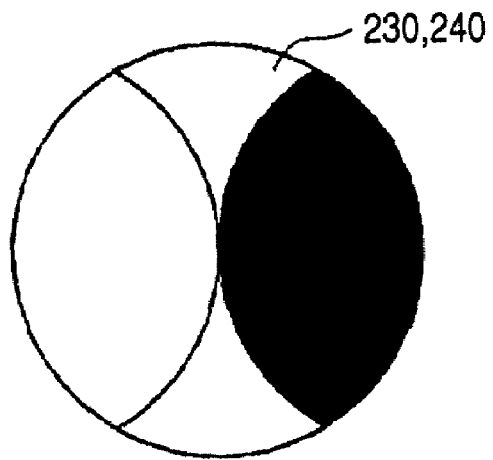
Figure 19B:
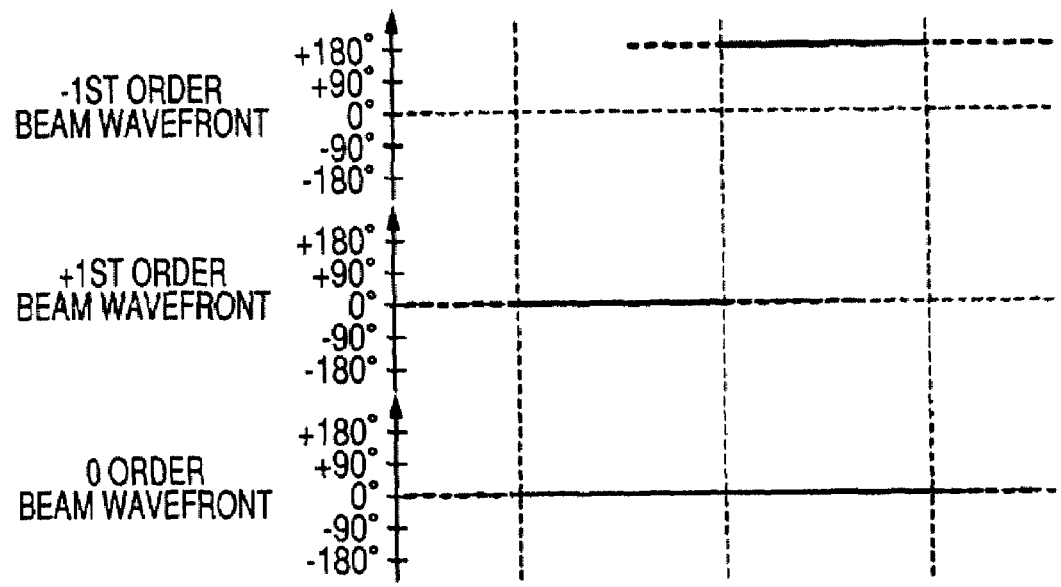
Figure 19C:
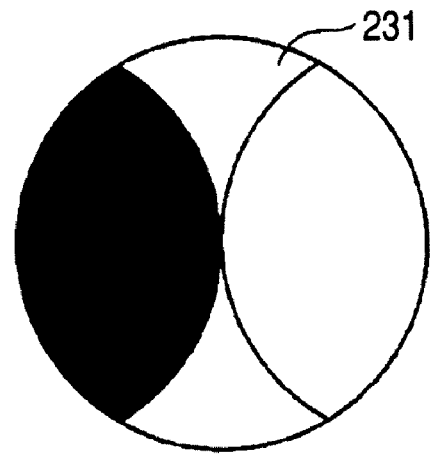
Figure 19D:
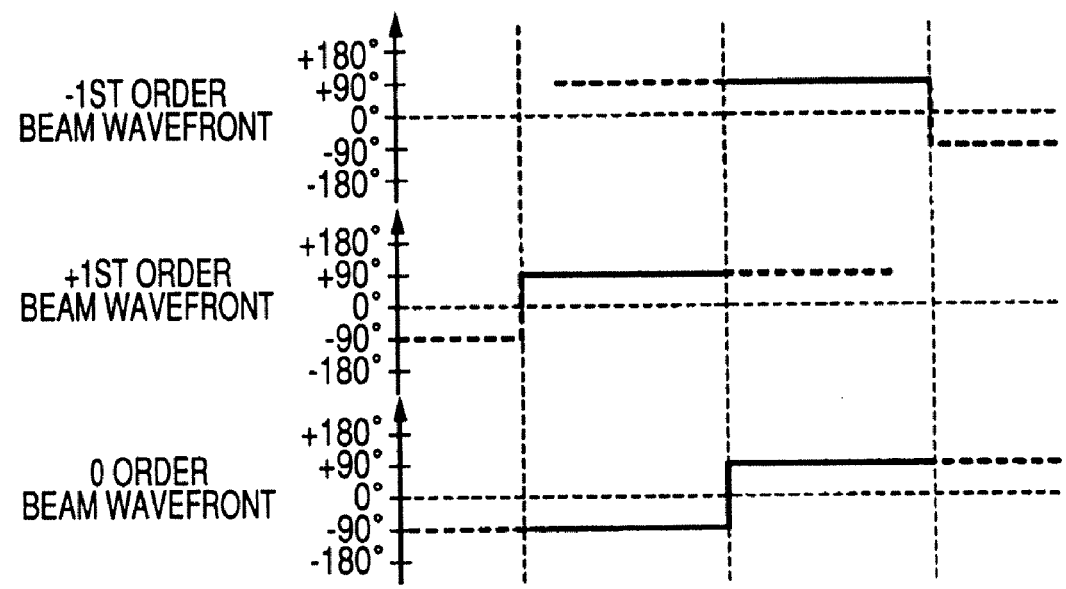

In the optical pickup according to the two area in-line DPP method, when the objective lens is not displaced, as shown in FIGS. 19C and 19D, a first sub-spot 231 has an angle of zero degree or an angle of 180 degrees of a uniform wavefront phase difference between the zero order beam and the positive and negative first order diffracted beams diffracted and separated at the guide groove 11a on the optical disc 11 throughout the area in the right and left overlaid areas. Thus, the light intensity in that portion is made uniform throughout to the dark part or the light part.

Then, in the optical pickup according to the two area in-line DPP method, when the objective lens is displaced, the positive first order diffracted beam in a wavefront shape asymmetrical to the central optical axis of the objective lens is converged as a convergence sub-spot 221 onto the signal recording surface of the optical disc 11. In the phase distribution of the spot 231 for detection which is reflected in the optical disc 11 and converged and formed on the light receiving surface of the photodetector 34b, as shown in FIG. 20B, an area appears in which the phase difference between the wavefronts of the zero order beam and the positive and negative first order diffracted beams are partially shifted from an angle of zero degree to an angle of 180 degrees, or from an angle of 180 degrees to an angle of zero degree even in the right and left overlaid areas.

Figure 20A:
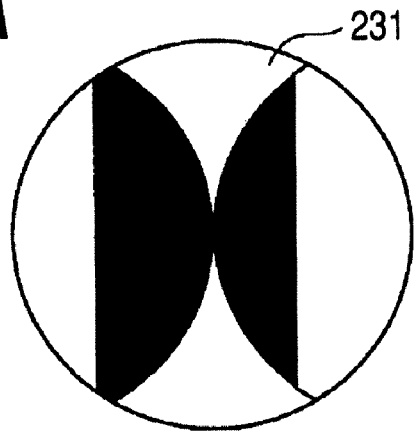
Figure 20B:
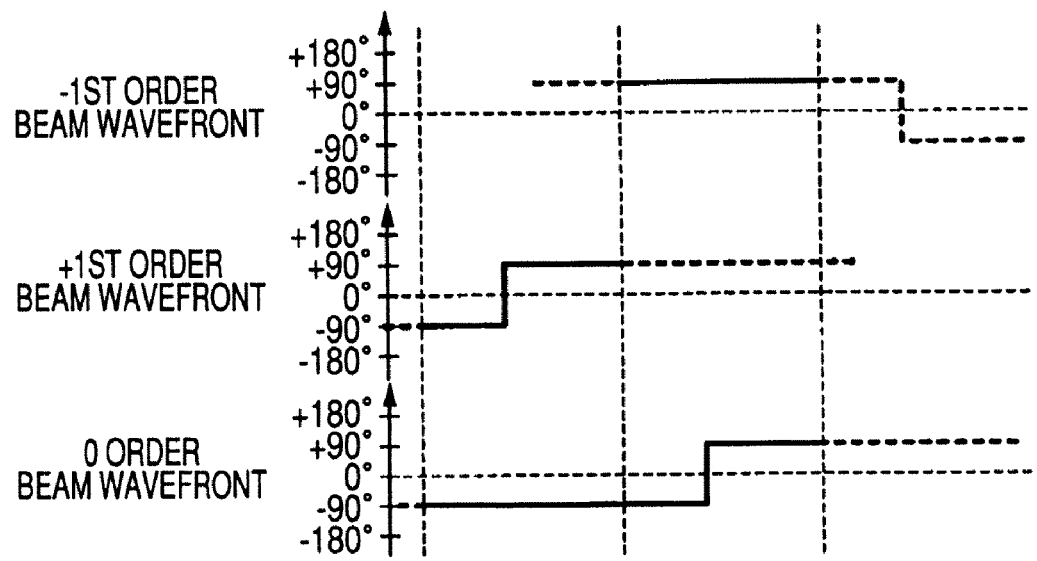
Figure 21:
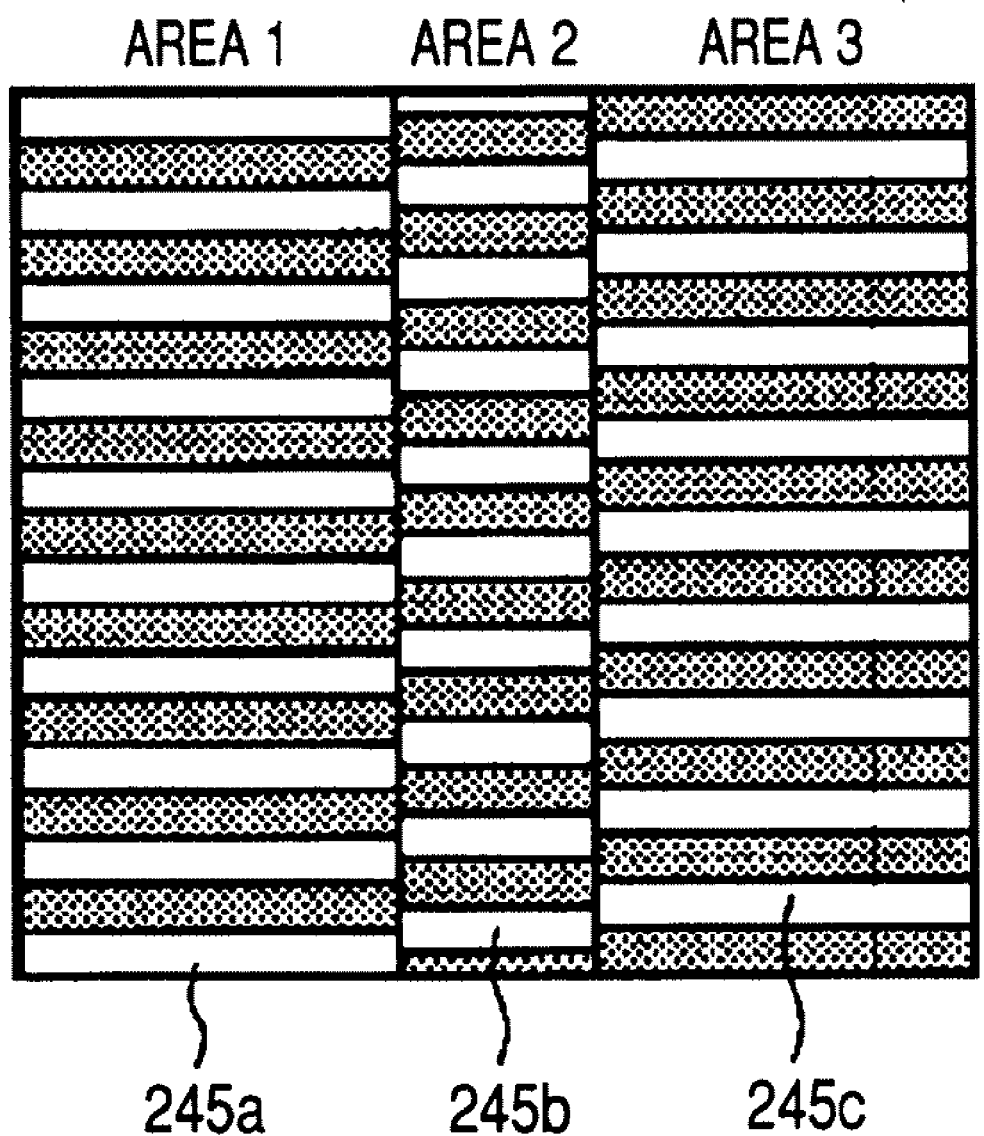
FIG. 21 shows a plan view depicting a diffractive element configuring the optical pickup according to the three area in-line DPP method.
Figure 22A:
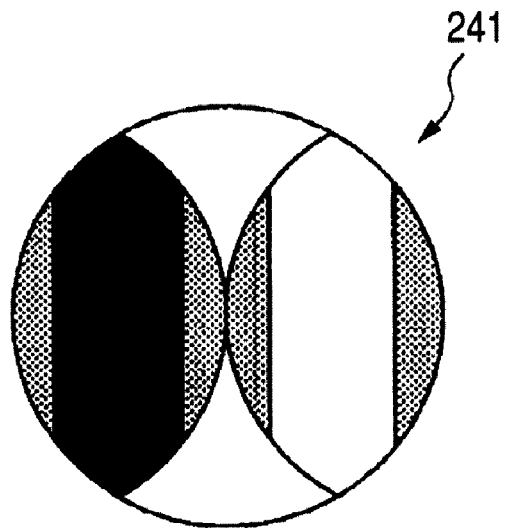
FIGS. 22A and 22B illustrate a sub-spot detected by a photodetector, the sub-spot formed by the light beams that are diffracted by the diffractive element of the optical pickup according to the three area in-line DPP method.
Figure 22B:
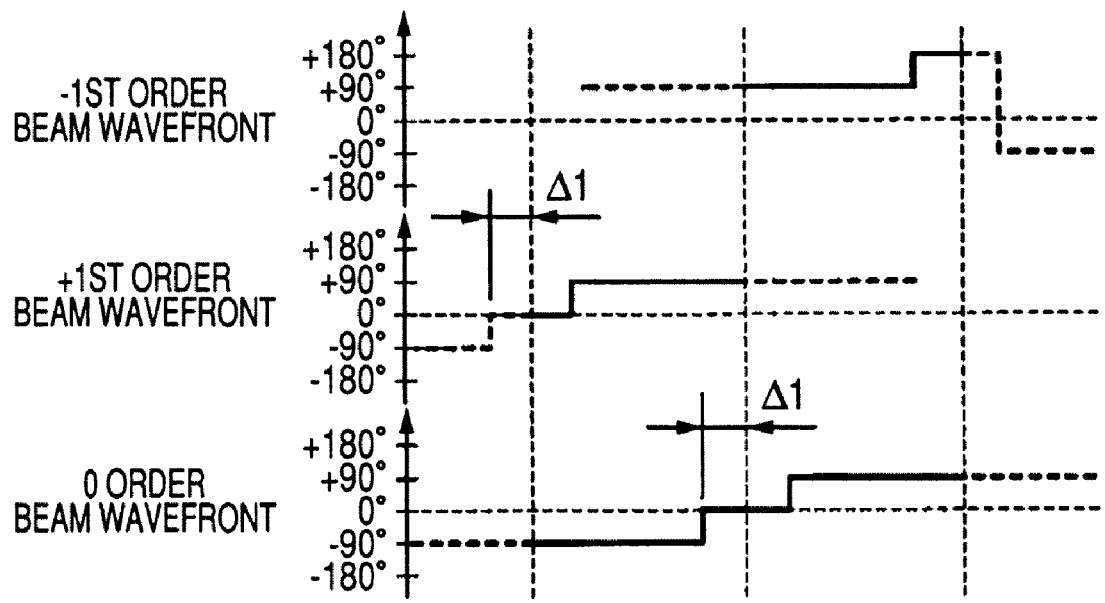
Figure 23A:
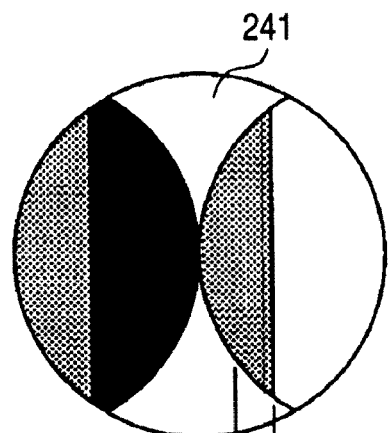
Figure 23B:
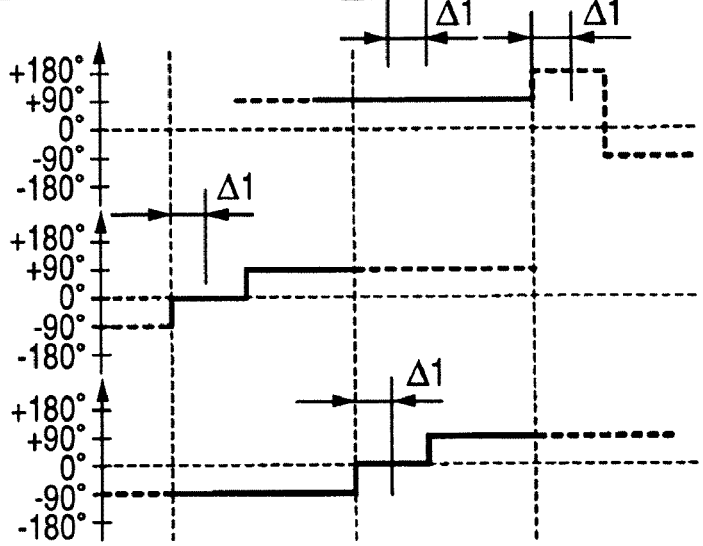
Figure 24A:
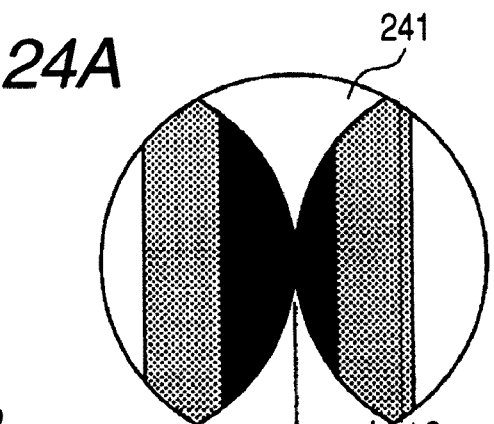
FIGS. 24A and 24B illustrate a sub-spot detected by the photodetector, the sub-spot formed by the light beams that are diffracted by the diffractive element when the objective lens of the optical pickup according to the three area in-line DPP method is displaced by $\Delta X_2$ exceeding a predetermined amount $\Delta X_1$.
Figure 24B:
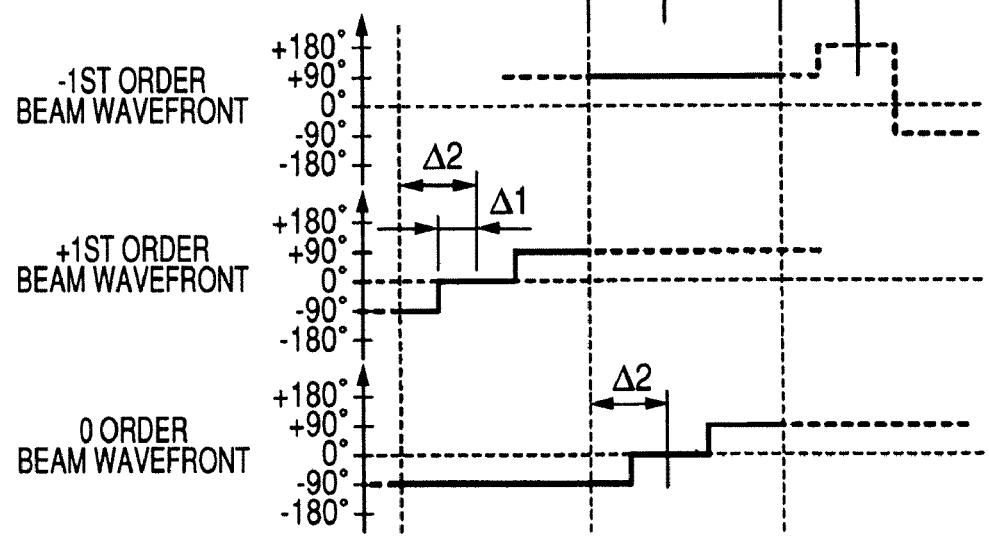

Consequently, as shown in FIG. 20A, in the spot 231, a dark part partially appears in the light part, or a light part partially appears in the dark part. As described above, since the area in which light and dark parts are partially inverted appears in the area of the sub-spot 231 for detection, the push-pull signal obtained from the differential signal of the signals detected from the right and left detection planes is clearly decreased in the modulation degree.

As described above, in the optical pickup according to the two area in-line DPP method, the characteristics of the field of view of the tracking error signal are deteriorated.

Next, in the optical pickup 1 which is provided with the diffractive element 32 having the first to fourth areas 41, 42, 43 and 44 and to which an embodiment of the invention is adapted (the four area in-line DPP method), the change in the light intensity distribution of the spot on the light receiving surface will be described when the objective lens is displaced.

In the optical pickup 1, when the objective lens is not displaced, the first sub-beam diffracted and separated by the diffractive element 32 having four split areas and converged onto the optical disc 11 and reflected has the wavefront in a projected and recessed shape which is shifted alternately in four stages at an angle of 180 degrees as shown in FIGS. 4A and 4B as described above.

Then, as shown in FIGS. 6C and 6D, the sub-spot 111 on the light receiving surface 34b has an angle of zero degree or an angle of 180 degrees of a uniform wavefront phase difference between the zero order beam and the positive and negative first order diffracted beams diffracted and separated at the guide groove 11a on the optical disc 11 throughout the area in the right and left overlaid areas. Thus, the light intensity in that portion is also made uniform to the dark part or the light part throughout the surface.

Figure 7A:
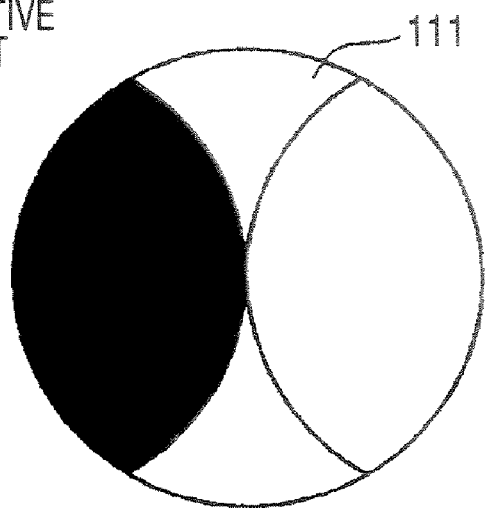
Figure 7B:
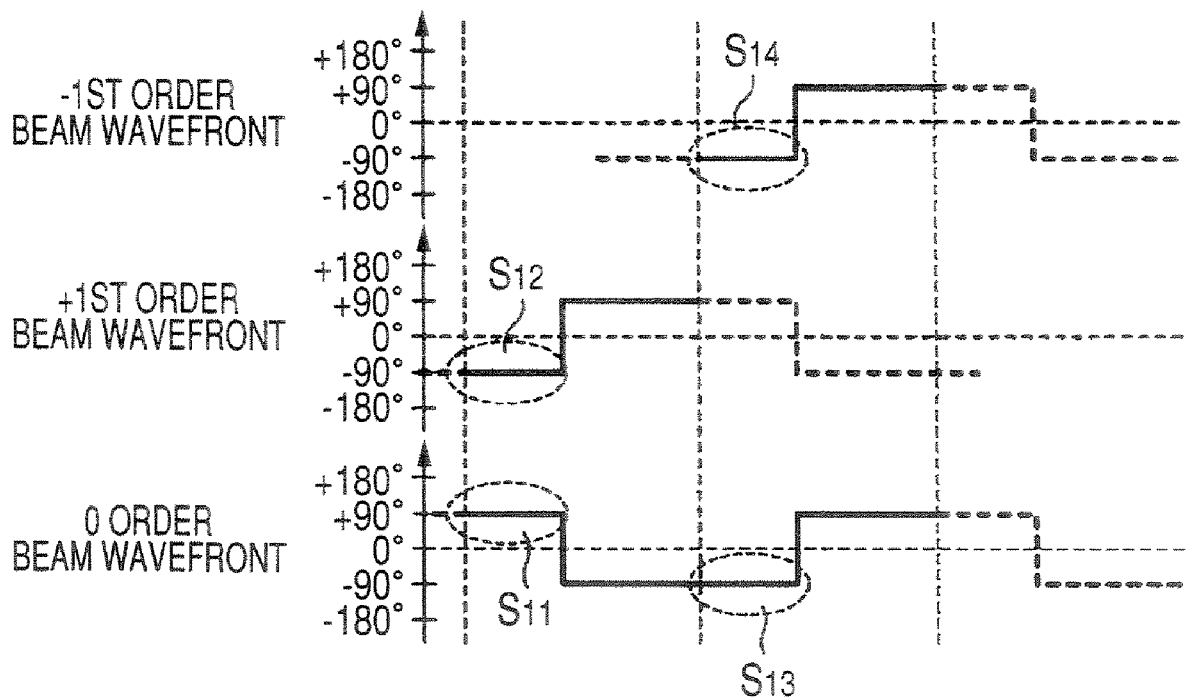

Then, in the optical pickup 1, when the objective lens 33 is displaced in the radius direction of the optical disc 11, the first sub-beam laterally asymmetrical to the central optical axis of the objective lens 33 is converged as the first sub-spot 101 onto the recording surface of the optical disc 11. FIGS. 7A and 7B show the light intensity distribution and the phase distribution of the light spot ill for detection which is reflected in the optical disc 11 and formed on the light receiving surface of the photodetector 34b.

As shown in FIG. 7B, in the area in which the zero order beam is overlapped with the positive first order diffracted beam, a wavefront $S_{11}$ appears that is shifted from an angle of $-90$ degrees to an angle of $+90$ degrees, and in the area in which the positive first order diffracted beam is overlapped with the zero order beam, a wavefront $S_{12}$ appears that is shifted from an angle of $+90$ degrees to an angle of $-90$ degrees. Since the wavefronts $S_{11}$ and $S_{12}$ have a phase difference at an angle of 180 degrees, the area in which the zero order beam and the positive first order diffracted beam are overlapped with each other has the same phase difference as that before the objective lens is displaced. In addition, the wavefront S11 is generated by the first area 41 of the diffractive element 32, and the wavefront $S_{12}$ is generated by the second area 42.

Moreover, in the area in which the zero order beam is overlapped with the negative first order diffracted beam, a wavefront $S_{13}$ appears that is shifted from an angle of $+90$ degrees to an angle of $-90$ degrees, and in the area in which the negative first order diffracted beam is overlapped with the zero order beam, a wavefront $S_{14}$ appears that is shifted from an angle of $+90$ degrees to an angle of $-90$ degrees. Since the wavefronts $S_{13}$ and $S_{14}$ have a phase difference at an angle of zero degree, the area in which the zero order beam and the negative first order diffracted beam are overlapped with each other has the same phase difference as that before the objective lens is displaced. In addition, the wavefront $S_{13}$ is generated by the second area 42 of the diffractive element 32, and the wavefront $S_{14}$ is generated by the first area 41.

Therefore, as shown in FIG. 7A, even when the objective lens is displaced, the light intensity distribution, that is, the light and dark conditions are the same as those before displaced as shown in FIG. 6C.

Accordingly, the optical pickup to which an embodiment of the invention is adapted can prevent a deterioration in the characteristics of the field of view of the tracking error signal caused by the differential push-pull method when the objective lens is displaced, as the two area in-line DPP method described above. More specifically, it can obtain an excellent tracking error signal even when the objective lens 33 is displaced.

Moreover, the optical pickup 1 can prevent a problem that in the optical pickup according to the three area in-line DPP method provided with the diffractive element 245 having three diffraction areas 245a, 245b and 245c, when a displacement of the objective lens exceeds a predetermined amount $\Delta X_1$, a signal is deteriorated and the push-pull operation output drops to deteriorate the signal-to-noise ratio of the tracking error signal itself affected by the second diffraction area 245b which is intended to improve the characteristics of the field of view when the objective lens is displaced. More specifically, a deterioration in the amplitude of a tracking error signal can be improved when the objective lens is displaced as well as an excellent tracking error signal can be obtained.

In addition, in the optical pickup 1, it is configured to be provided with the diffractive element 32 having the first to fourth areas 41, 42, 43 and 44 in which the phases of the adjacent grating grooves are formed as they are shifted at an angle of 180 degrees. However, the difference between the phases of the periodic structures in each area is not limited thereto.

Next, an optical pickup 60 shown in FIG. 2 will be described which uses another exemplary diffractive element in a different periodic structure. In addition, in the description below, the common signs and symbols are assigned to the portions common with those of the optical pickup 1, omitting the detailed description.

As shown in FIG. 2, the optical pickup 60 to which an embodiment of the invention is adapted has a light source 31 which emits a predetermined wavelength of a light beam, a diffractive element 62 which diffracts the light beam emitted from the light source 31 and separates it into three light beams formed of a main beam and first and second sub-beams, an objective lens 33 which converges the three light beams separated by the diffractive element 62 onto the signal recording surface of an optical disc 11 and separately applies three convergence spots on the signal recording surface, and a photodetector 34 which has a plurality of light receiving surfaces each separated into two or more areas and receives the returning lights reflected in the signal recording surface of the optical disc 11.

Moreover, as similar to the optical pickup 1, the optical pickup 60 has a beam splitter 36, a collimator lens 37, a mirror 38, a ¼ wave plate 39, and a cylindrical lens 40.

The diffractive element 62 diffracts the light beam emitted from the light source 31, and splits it into three light beams in order to obtain a tracking error signal. More specifically, the diffractive element 62 splits the light beam into a zero order beam which transmits the incident light beam as it is (hereinafter, called a "main beam") and positive and negative first order diffracted beams which are branched at a predetermined diffraction angle (hereinafter, called a "first sub-beam" and a "second sub-beam").

Figure 8:
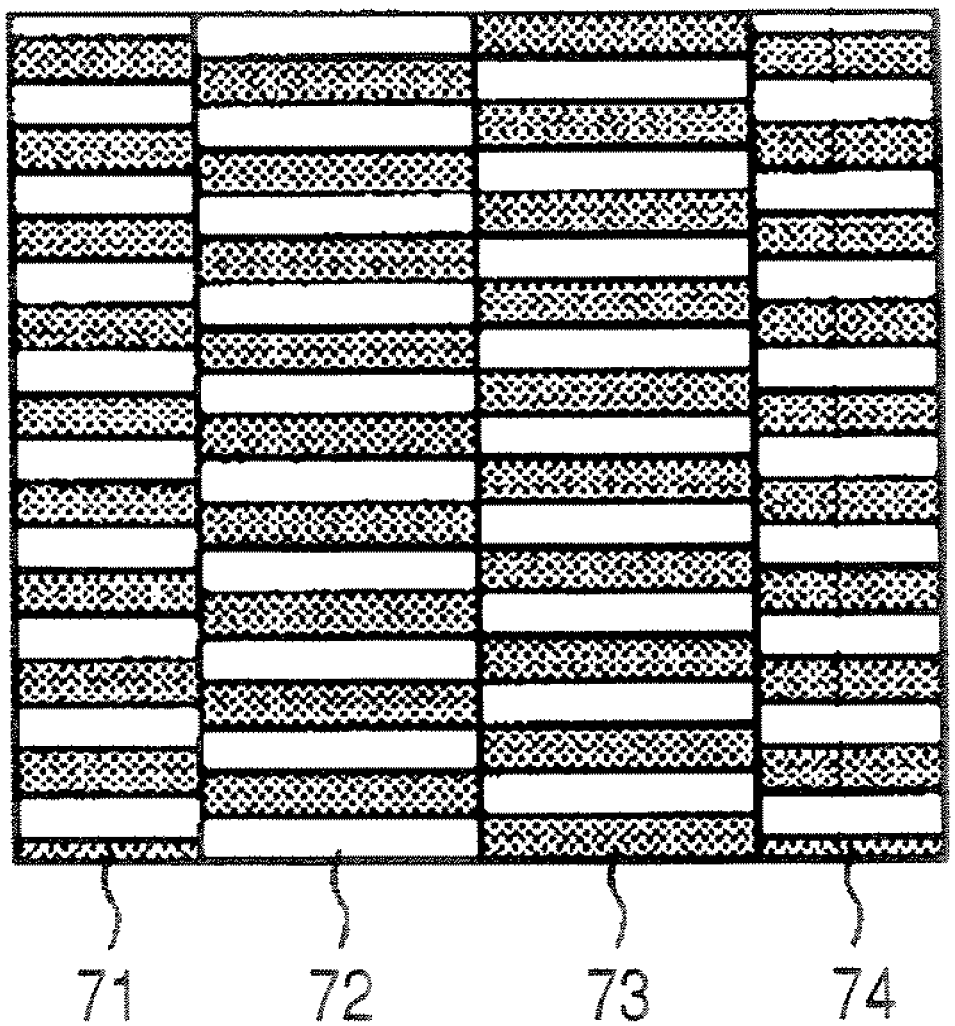
FIG. 8 shows a plan view depicting another exemplary diffractive element configuring an optical pickup to which an embodiment of the invention is adapted.

The diffractive element 62 is a diffraction grating which is formed of a transmissive member and has a special grating pattern, in which grating grooves are formed on the grating surface at a predetermined cycle. Then, as shown in FIG. 8, the grating surface is split into at least four areas, first to fourth areas 71, 72, 73 and 74, each area has a projected and recessed pattern in parallel, by the split lines orthogonal in the direction where the grating grooves are formed, that is, the grating surface is split into four areas in the tracking direction (a radial direction) In the first to fourth areas 71, 72, 73 and 74, the grating grooves are periodically formed in each area at a predetermined width, having a periodic structure. The grating grooves formed in the adjacent areas are arranged in such a way that they are shifted by about ¼, about ½, about ¼ of the cycle of the grating grooves, that is, the phases of the grating grooves are formed as they are shifted at an angle of 90 degrees, an angle of 180 degrees, and an angle of 90 degrees.

In other words, the diffractive element 62 as the first to fourth areas 71, 72, 73 and 74 each having a predetermined periodic structure in the areas in which the areas are split by the split lines of the tangential direction orthogonal to the tracking direction, and arranged side by side in the tracking direction. The second and third areas 72 and 73 disposed on the both sides approximately at the central line of the diffractive element 62 are arranged adjacently, and they are formed in such a way that the phases of the periodic structures disposed in the second and third areas 72 and 73 are varied at an angle of 180 degrees. The first area 71 is arranged on the opposite side of the third area 73 adjacently to the second area 72, that is, it is arranged outside the second area 72, and it is formed in such a way that the phase of the periodic structure disposed in the first area 71 is varied at an angle of about 90 degrees with respect to the phase of the periodic structure in the second area 72. The fourth area 74 is arranged on the opposite side of the second area 72 adjacently to the third area 73, that is, it is arranged outside the third area 73, and it is formed in such a way that the phase of the periodic structure disposed in the fourth area 74 is varied at an angle of about 90 degrees with respect to the phase of the periodic structure in the third area 73.

The diffractive element 62 formed in the special pattern like this diffracts and separates the transmitting light beam into at least the main beam and the first and second sub-beams as well as it provides a predetermined modulation to the wavefronts of the lightwaves of the first and second sub-beams.

Figure 9A:
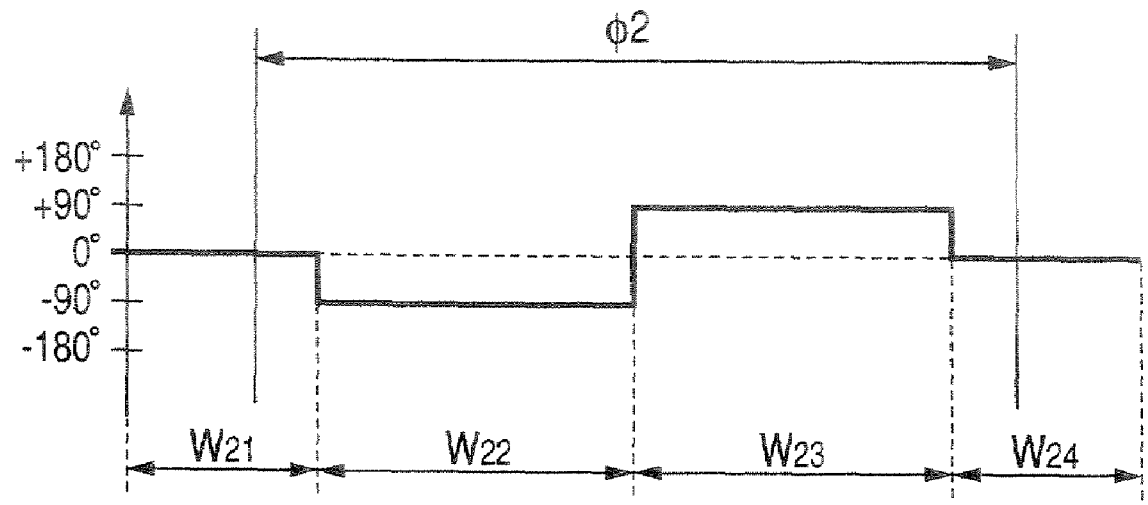

For example, as shown in FIG. 9A, the wavefronts of the first sub-beam and the second sub-beam have a projected and recessed wavefront shape in which the wavefront phases are alternately shifted in four stages at an angle of 90 degrees, an angle of 180 degrees, and an angle of 90 degree on the objective lens pupil. At this time, among the wavefronts shifted in four stages, widths $W_{22}$ and $W_{23}$ of two areas at the center correspond to the widths of the second and third areas 72 and 73 arranged at the center of the diffractive element 62, respectively. In addition, FIG. 9A and FIG. 9B, described later, show the wavefront shape of the first sub-beam, and the wavefront shape of the second sub-beam has the shape in which the wavefront shape of the positive first order diffracted beam is inverted laterally. More specifically, the wavefronts of the first and second sub-beams have inverted phases to each other, and have the wavefront shapes in inverted projected and recessed shapes. On the other hand, the zero order beam transmitting through the diffractive element 62 unchanged is not affected by the grating pattern.

For example, as shown in FIG. 9A, the diffractive element 62 is formed in which the sum of the width $W_{22}$ of the second area and the width $W_{23}$ of the third area satisfies the following equation (2) in the relation with an objective lens pupil diameter $\phi_2$.

$$W_{22}+W_{23}=\phi_2 \cdot \alpha_2 \quad (2)$$

Figure 9B:
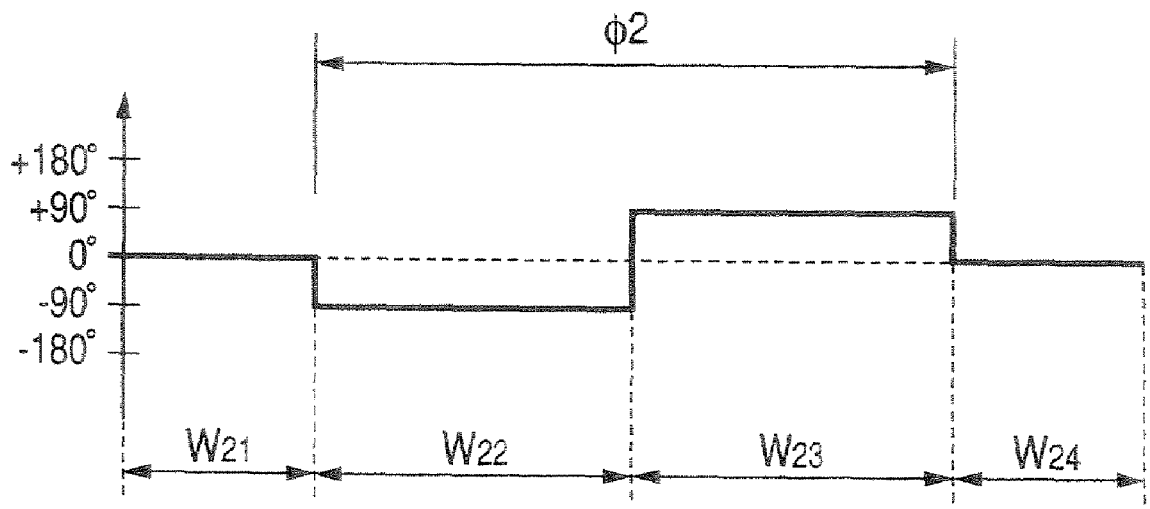

Particularly in the discussion below, as shown in FIG. 9B, $\alpha_2=1$, and the discussion will proceed as the sum of the widths $W_{22}$ and $W_{23}$ is equal to the objective lens pupil diameter $\phi_2$, but which is not limited thereto, it is sufficient that $\alpha_2$ is in a predetermined range.

Moreover, the diffractive element 62 is arranged in such a way that three split light beams each pass through the optical components and are converged into the objective lens 33, whereby each of the convergence spots formed on the signal recording surface of the optical disc 11 is applied onto the same track on the optical disc 11, that is, the spacing in the tracking direction is zero, the spacing is orthogonal to the track of each of the convergence spots.

Since the diffractive element 62 thus configured provides to the first and second sub-beams that are three diffracted and separated light beams a projected and recessed wavefront shape in which the wavelengths are alternately shifted in four stages at an angle of 90 degrees, an angle of 180 degrees, and an angle of 90 degrees, the light intensity distribution (light quantity distribution) of sub-spots 131 and 132 on the light receiving surface of the photodetector can be inverted with respect to the light intensity distribution (light quantity distribution) of a main spot 130 by the main beam on the light receiving surface. Therefore, an excellent tracking error signal can be obtained, and a tracking error signal with no signal deterioration can be obtained even though the objective lens is displaced.

As similar to the case of the optical pickup 1, the objective lens 33 converges the incident three light beams that have been split by the diffractive element 62, have passed through the beam splitter 36, the collimator lens 37, the mirror 38 and the ¼ wave plate 39 and have entered therein onto the signal recording surface of the optical disc 11, and separately forms three convergence spots 100, 101 and 102 on the signal recording surface of the optical disc 11 as shown in FIG. 5.

The photodetector 34 is arranged to receive the reflected beams of the three convergence spots 100, 101 and 102 from the optical disc 11 on a plurality of the light receiving surfaces each split into two or more areas. More specifically, the photodetector 34 has a four area light receiving surface 34a which receives the returning light of the main beam and two area light receiving surfaces 34b and 34c which receive the returning lights of the first and second sub-beams, respectively. In the four area light receiving surface 34a, the returning light of the main beam is converged to form the main spot 130 for detection, and in the two area light receiving surfaces 34b and 34c, the returning light of the first and second sub-beams are converged to form the sub-spots 131 and 132 for detection. The photodetector 34 can receive the light beams split into three light beams by the diffractive element 62, and can detect information signals as well as various signals such as a tracking error signal and a focusing error signal.

Then, photoelectric conversion signals from the light receiving surfaces 34a, 34b and 34c are subtracted by subtracters 50a, 50b and 50c, respectively, thereby detecting the push-pull signals Sa, Sb and Sc of the main spot 130, and the sub-spots 131 and 132. The push-pull signals Sa, Sb and Sc are added, amplified, and subtracted to output an excellent tracking error signal, which is the same as the optical pickup 1, omitting the detailed description here.

The optical pickup 60 thus configured can detect an excellent tracking error signal with high sensitivity in which the offset component is greatly decreased and only the amplitude is amplified regardless of the difference in the track pitch of the optical disc.

The principle of detecting the tracking error signal in the optical pickup 60 thus configured is the same as that of the optical pickup 1, omitting the detailed description.

As similar to the optical pickup 1, the optical pickup 60 to which an embodiment of the invention is adapted can detect an excellent tracking error signal from the optical discs having different track pitches all the time.

Next, in the four area in-line DPP method like the optical pickup 60, the change in the light intensity distribution of each of the spots on the light receiving surface will be discussed when the objective lens 33 is displaced in the tracking direction.

In the optical pickup 60, when the objective lens is not displaced, as shown in FIG. 9B, the first sub-beam diffracted, separated by the diffractive element 62 having four split areas and converged and reflected in the optical disc 11 has the wavefront in a projected and recessed shape in which the wavefronts are alternately shifted in four stages at an angle of 90 degrees, an angle of 180 degrees, and an angle of 90 degrees.

Figure 10A:
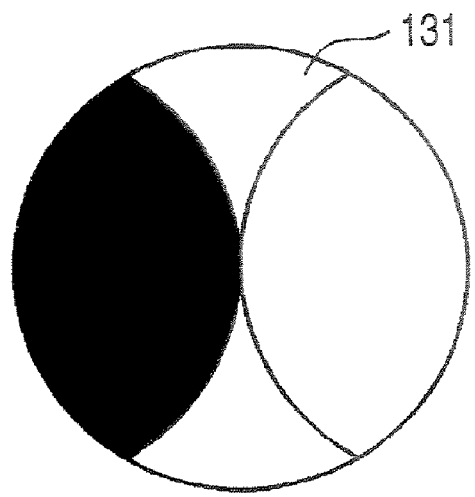
Figure 10B:
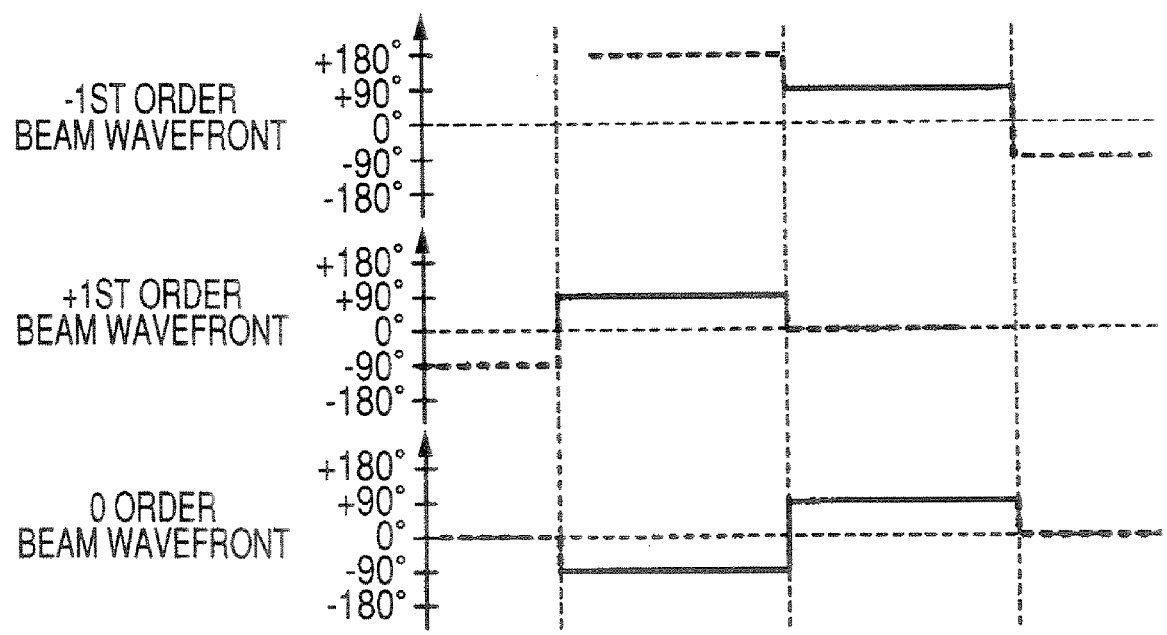

As shown in FIGS. 10A and 10B, the sub-spot 131 on the light receiving surface 34b on which the first sub-beam reflected in the optical disc 11 is converged has an angle of zero degree or at an angle of 180 degrees of a uniform wavefront phase difference between the zero order beam and the positive and negative first order diffracted beams diffracted and separated at the guide groove 11a on the optical disc 11 throughput the area in the right and left overlaid areas. Thus, the light intensity in that portion is made uniform throughout to the dark part or the light part. Here, FIG. 10A shows the light intensity distribution of the sub-spot 131 when three convergence spots on the optical disc 11 are at the position shifted by a quarter of the cycle of the guide groove 11a, and FIG. 10B shows the phase distribution of the zero order beam wavefront and the positive and negative first order beam wavefronts of the first sub-beam at this time. In addition, the main spot 130 of the main beam on the light receiving surface 34a is in the same state as the main spot 110 shown in FIGS. 6A and 6B.

Figure 11A:
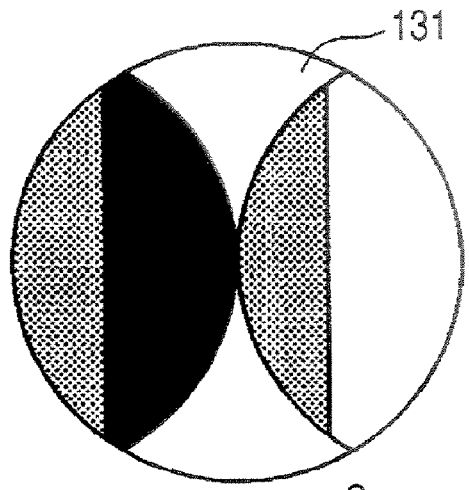
Figure 11B:
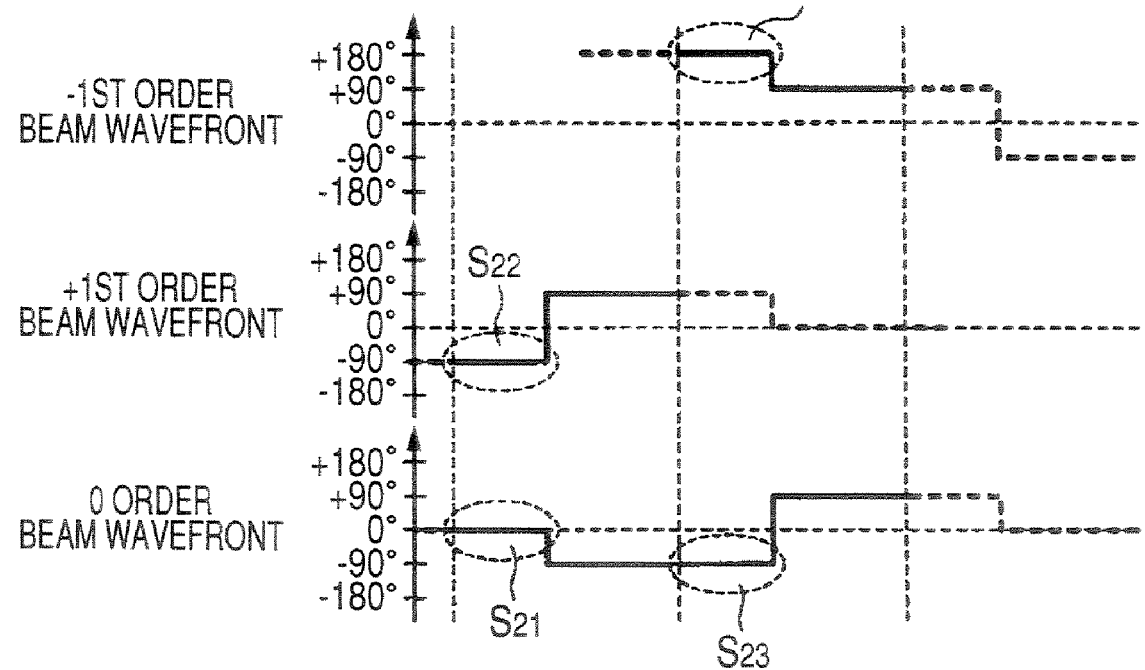

Then, in the optical pickup 60, when the objective lens 33 is displaced in the radius direction of the optical disc 11, the first sub-beam laterally asymmetrical to the central optical axis of the objective lens 33 is converged as the first sub-spot 101 onto the recording surface of the optical disc 11. FIGS. 11A and 11B show the light intensity distribution and the phase distribution of the light spot 131 for detection which is reflected in the optical disc 11 and formed on the light receiving surface of the photodetector 34b.

As shown in FIG. 11A, in the area in which the zero order beam is overlapped with the positive first order diffracted beam, a wavefront $S_{21}$ appears that is shifted from an angle of −90 degrees to an angle of zero degree, and in the area in which the positive first order diffracted beam is overlapped with the zero order beam, a wavefront $S_{22}$ appears that is shifted from an angle of +90 degrees to an angle of −90 degrees. Since the wavefronts $S_{21}$ and $S_{22}$ have a phase difference at an angle of 90 degrees, the area in which the zero order beam and the positive first order diffracted beam are overlapped with each other has the phase difference that is shifted from an angle of 180 degrees to an angle of 90 degrees before the objective lens is displaced. However, the light and dark conditions are not inverted, and the area is a semi-inverse area in which the light intensity is the intermediate condition between the light part and the dark part. In addition, the wavefront $S_{21}$ is generated by the first area 71 of the diffractive element 62, and the wavefront $S_{22}$ is generated by the second area 72.

Moreover, in the area in which the zero order beam is overlapped with the negative first order diffracted beam, a wavefront $S_{23}$ appears that is shifted from an angle of +90 degrees to an angle of −90 degrees, and in the area in which the negative first order diffracted beam is overlapped with the zero order beam, a wavefront $S_{24}$ appears that is shifted from an angle of +90 degrees to an angle of +180 degrees. Since the wavefronts $S_{23}$ and $S_{24}$ have a phase difference at an angle of 270 degree, the area in which the zero order beam and the negative first order diffracted beam are overlapped with each other partially has a semi-inverse area in which the light intensity is the intermediate condition between the light part and the dark part. In addition, the wavefront $S_{23}$ is generated by the second area 72 of the diffractive element 62, and the wavefront $S_{24}$ is generated by the first area 71.

Therefore, as shown in FIG. 11A, even when the objective lens is displaced, there is no area in which the light and dark conditions are inverted as in the two area in-line DPP method (the comparative example), and in the light intensity distribution, that is, in the light and dark conditions, such an area is generated that the light part and the dark part are in the intermediate condition. However, the state is not different from the state before the objective lens is displaced as shown in FIG. 10A, and a tracking error signal can be obtained excellently.

Accordingly, the optical pickup 60 to which an embodiment of the invention is adapted can prevent a deterioration in the characteristics of the field of view of the tracking error signal caused by the differential push-pull method when the objective lens is displaced, as the two area in-line DPP method described above. More specifically, it can obtain an excellent tracking error signal even when the objective lens 33 is displaced.

Moreover, the optical pickup 60 can prevent a problem that in the optical pickup according to the three area in-line DPP method, when a displacement of the objective lens exceeds a predetermined amount $\Delta X_1$, a signal is deteriorated and the push-pull operation output is dropped to deteriorate the signal-to noise ratio of the tracking error signal itself affected by the second diffraction area 245b which is intended to improve the characteristics of the field of view when the objective lens is displaced. More specifically, a deterioration in the amplitude of a tracking error signal can be improved when the objective lens is displaced as well as an excellent tracking error signal can be obtained.

The optical pickup 60 to which an embodiment of the invention is adapted can obtain an excellent tracking error signal from a plurality of types of optical discs having different track pitches as well as it can obtain an excellent tracking error signal in which a deterioration in the amplitude of a tracking error signal is improved when the objective lens is displaced.

Moreover, the optical disc apparatus 10 to which an embodiment of the invention is adapted is provided with the optical pickup 1 or the optical pickup 60, whereby it can obtain an excellent tracking error signal from a plurality of types of optical discs having different track pitches as well as it can obtain an excellent tracking error signal in which a deterioration in the amplitude of a tracking error signal is improved when the objective lens is displaced, and it can improve the characteristics of recording and reproduction for the optical disc.

In addition, in the optical pickups 1 and 60, an explanation is given that the width of the overlaid area is a half of the pupil diameter, the overlaid area in which the zero order diffracted beam is overlapped with the positive and negative first order diffracted beams, the beams are three light beams by the optical disc 11. In this case, 1 is the optimum for $\alpha_1$ and $\alpha_2$. However, since the overlaid width depends on the relation between the track of the optical disc pitch (the guide groove the cycle) and the numerical aperture (NA) of the objective lens, a DVD-RAM disc and a DVD±R disc having different track pitches have different overlaid widths. Therefore, since the optimum values of $\alpha_1$ and $\alpha_2$ are varied for individual optical discs, such $\alpha_1$ and $\alpha_2$ are adopted that are suited for an optical disc recorded and reproduced by the optical pickups 1 and 60, whereby an excellent tracking error signal can be obtained as described above.

EXAMPLES

Figure 12A:
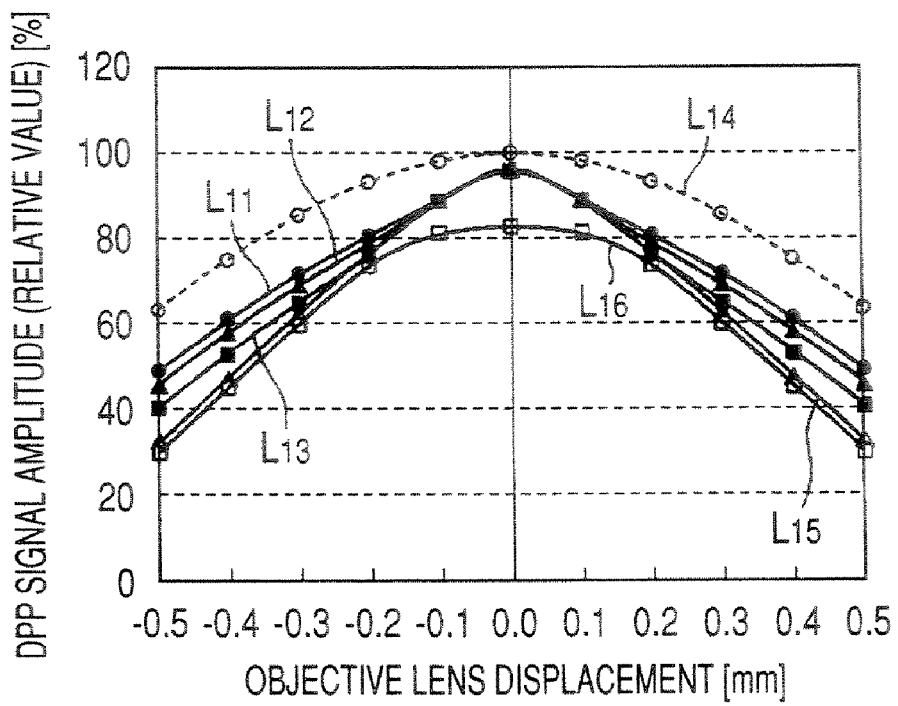
Figure 12B:
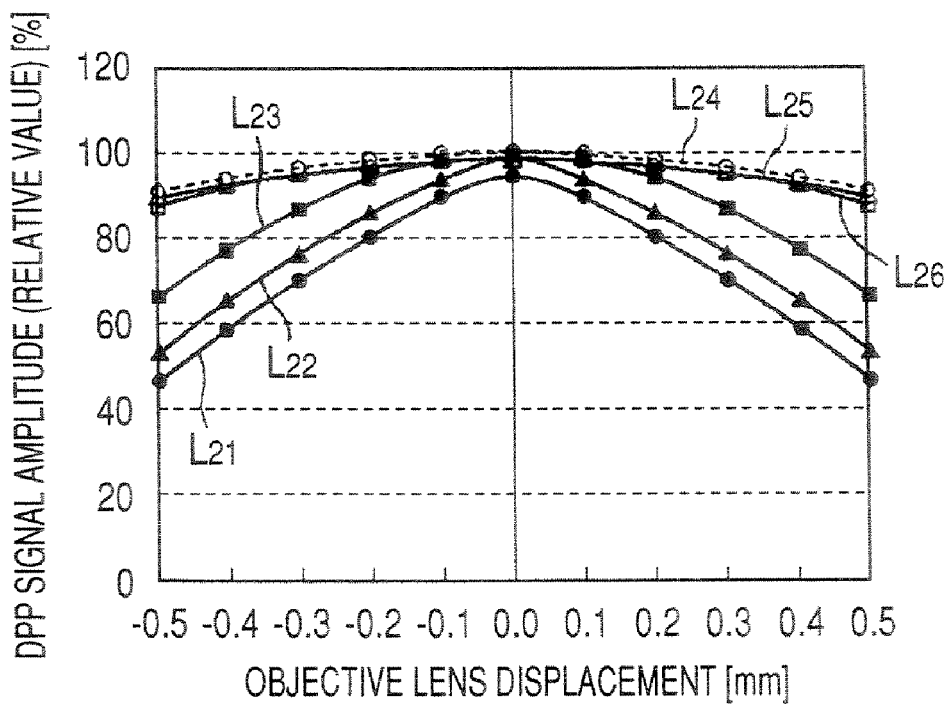

Hereinafter, for the optical pickups 1 and 60 to which an embodiment of the invention is adapted, specific numeric data is taken for simulation by a computer, and the optimum $\alpha_1$ and $\alpha_2$ will be described based on the result. Here, the following numeric values were used as essential parameters.
(1) Laser beam wavelength: 660 nm
(2) Scaling factor: about 6.5 fold
(3) Objective lens NA: about 0.65
(4) Focal length of the objective lens: about 2.8 mm
(5) Track pitch of a DVD-RAM disc (guide groove cycle): 1.23 μm
(6) Track pitch of a DVD±R disc (guide groove cycle): 0.74 μm Then, FIGS. 12A and 12B show the characteristics of the field of view of the DPP signal amplitude when the numeric data is used for the optical pickup 1 according to the four area in-line DPP method as Example 1. Here, the DPP signal is a tracking error signal. FIG. 12A shows the characteristics of the field of view for a DVD-RAM disc, and FIG. 12B shows the characteristics of the field of view for a DVD±R disc. Furthermore, as comparative examples for comparison therewith, the characteristics of the field of view are shown at the same time when the numeric data is used for the optical pickups according to the conventional DPP method, the two area in-line DPP method and the three area in-line DPP method.

In addition, in FIGS. 12A and 12B, the horizontal axis shows a displacement of the objective lens (mm), the vertical axis shows the relative value (%) of the DPP signal amplitude when the objective lens is displaced, that is, representing the relative value when the DPP signal amplitude is considered as 100% at the time when a displacement of the objective lens according to the conventional DPP method is zero, curves $L_{11}$ and $L_{21}$ show the characteristics of the field of view when the optical pickup 1 has $\alpha_1$=0.95, curves $L_{12}$ and $L_{22}$ show the characteristics of the field of view when the optical pickup 1 has $\alpha_1$=1.00, curves $L_{13}$ and $L_{23}$ show the characteristics of the field of view when the optical pickup 1 has $\alpha_1$=1.05, curves $L_{14}$ and $L_{24}$ show the characteristics of the field of view of the optical pickup according to the conventional DPP method, curves $L_{15}$ and $L_{25}$ show the characteristics of the field of view of the optical pickup according to the two area in-line DPP method, and curves $L_{16}$ and $L_{26}$ show the characteristics of the field of view of the optical pickup according to the three area in-line DPP method.

Figure 15:
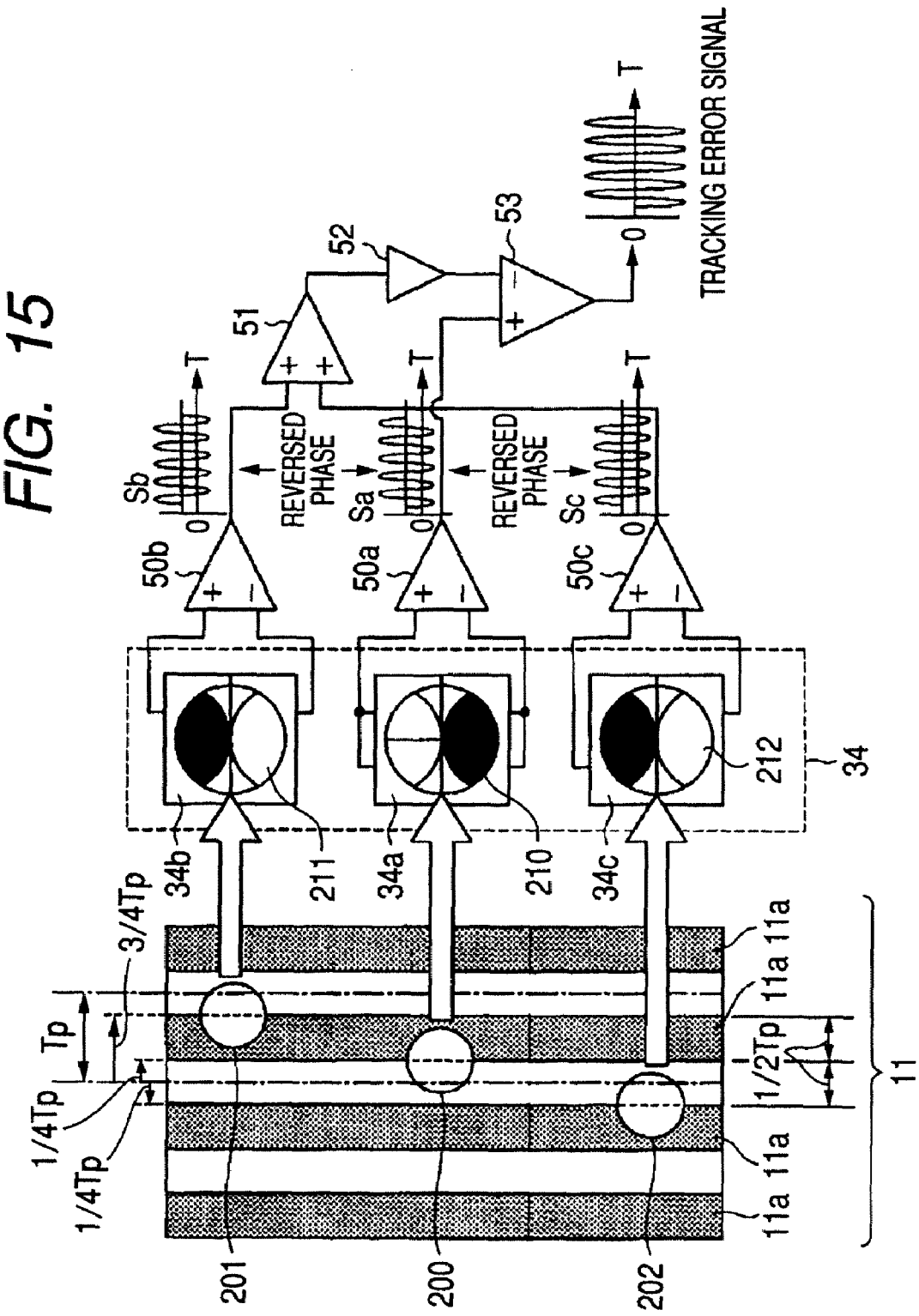
FIG. 15 shows a plan view depicting the arrangement of the convergence spots formed by the optical pickup according to the conventional DPP method, and shows a circuit diagram schematically depicting a detecting system by the spots on the light receiving surfaces.
Figure 16A:
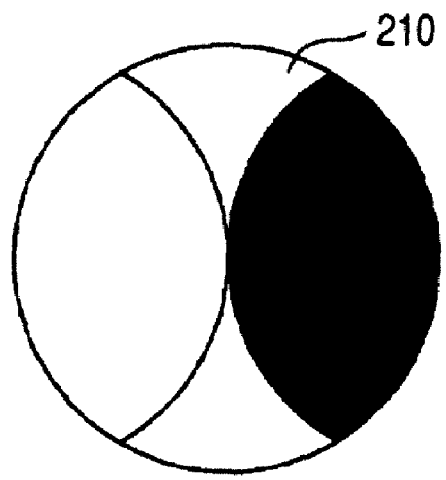
Figure 16B:
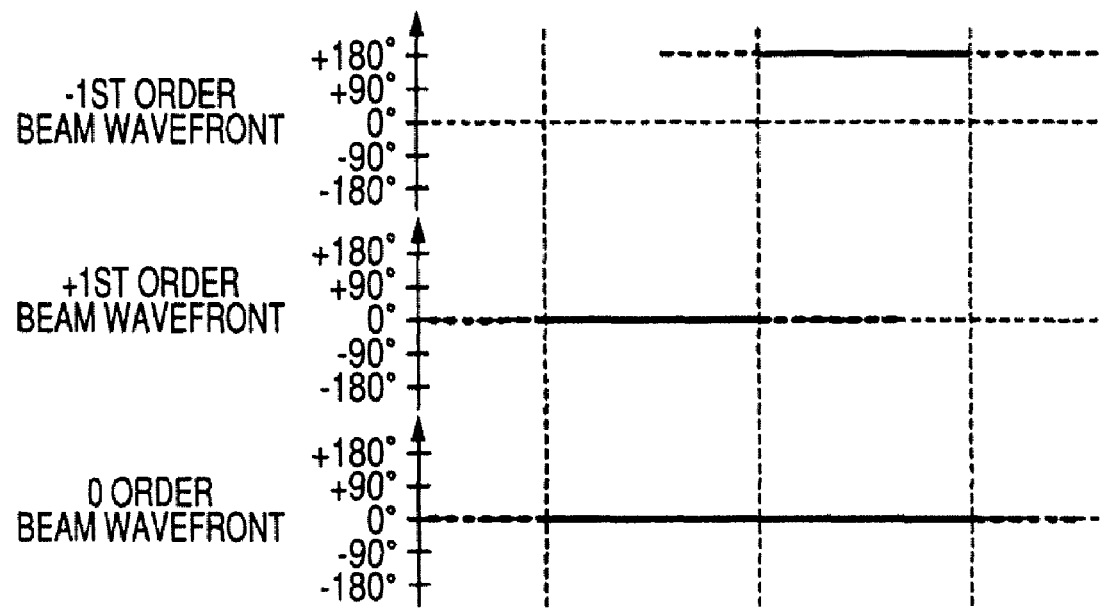
Figure 16C:
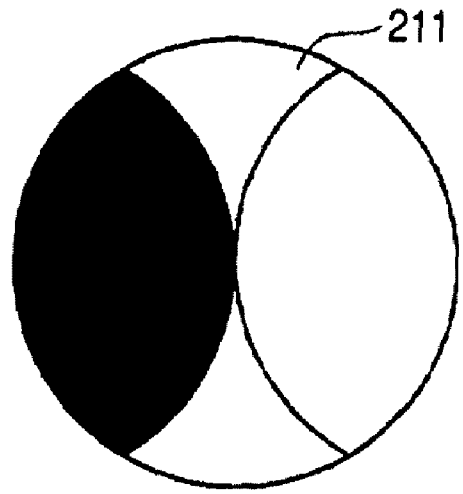
Figure 16D:
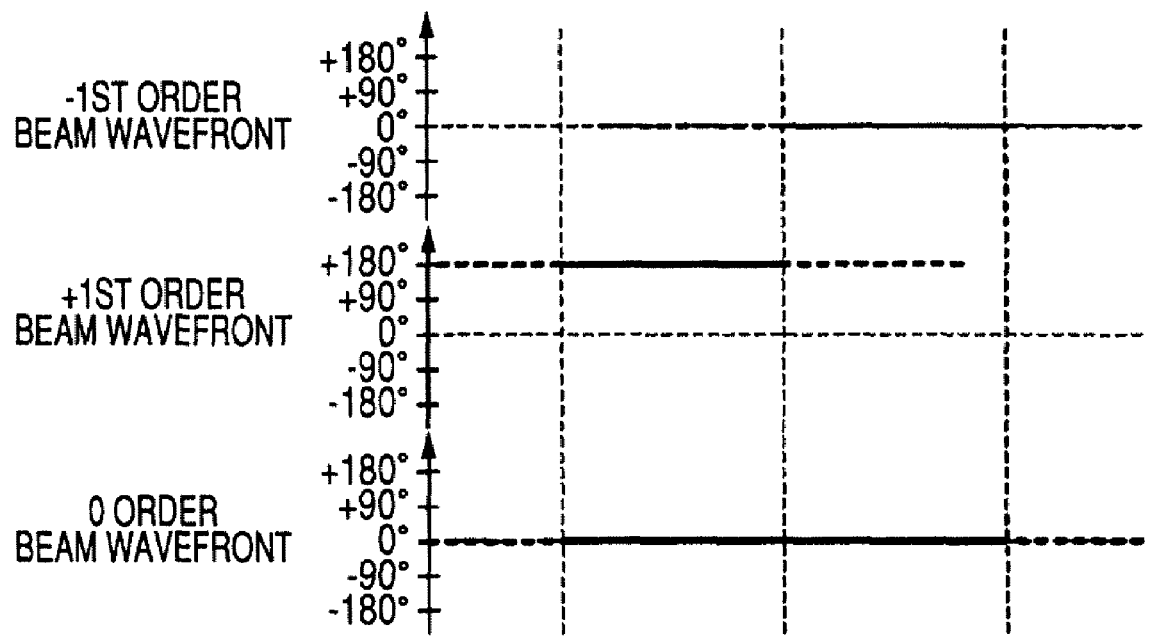

In addition, as described above, the positions of the sub-spots were arranged in such ways that in the optical pickup 1 to which an embodiment of the invention is adapted (the four area in-line DPP method), the optical pickup according to the two area in-line DPP method, and the optical pickup according to the three area in-line DPP method, as shown in FIGS. 5 and 18, the sub-spots were placed at the same track as the main spot and the spacing in the tracking direction is zero, and that in the optical pickup according to the conventional DPP method, as shown in FIG. 15, sub-spots were placed at the positions shifted by ±½ of the track pitch from the main spot in the tracking direction.

As shown in FIG. 12A, a DPP signal amplitude $L_{15}$ according to the two area in-line DPP method has the field of view (a displacement of the objective lens) that approximately linearly drops from zero in the case of a DVD-RAM disc, and when the field of view is about ±0.4 mm, it drops to a half of the amplitude or below at the field of view=zero.

Moreover, a DPP signal amplitude $L_{16}$ according to the three area in-line DPP method hardly drops when the field of view ranges within about ±0.2 mm, but it drops at almost the same gradient as that of the two area in-line DPP method when it is equal to or greater than ±0.2 mm.

Here, the characteristics of the field of view according to the three area in-line DPP method is one example that the width of the second area 245b is set to about 15% of the objective lens pupil diameter. When the width of the second area 245b is increased, the amount of the field of view that the amplitude drop occurs can be made greater. However, as described above, an increased width of the second area 245b causes the DPP signal amplitude to further drop at the field of view=zero, and it is already decreased by about 20% from the signal amplitude obtained by the conventional DPP method. Thus, it is difficult to increase the width of the second area 245b more than this.

On the other hand, in the characteristics of the field of view $L_{11}$, $L_{12}$ and $L_{13}$ of the optical pickup 1 according to Example 1 (the four area in-line DPP method), as shown in FIG. 12A, the DPP signal amplitude at the field of view=zero hardly drops within the range of $\alpha_1$=0.95 to 1.05 in the case of a DVD-RAM disc, and smooth characteristics of the field of view are obtained when the field of view ranges in ±0.2 mm or greater. Even when the field of view ranges in ±0.4 mm, a half of the amplitude or more at the field of view=zero can be secured.

Moreover, as shown in FIG. 12B, in the case of a DVD±R disc, in the characteristics of the field of view $L_{21}$, $L_{22}$ and $L_{23}$, the DPP signal amplitude drops at the field of view=zero when $\alpha_1$ is at 1.00 or below, causing a problem that a decrease becomes great with respect to the field of view. Therefore, for the setting value of $\alpha_1$, it is desirable to set to $\alpha_1$=about 1.00 to 1.05.

Figure 13A:
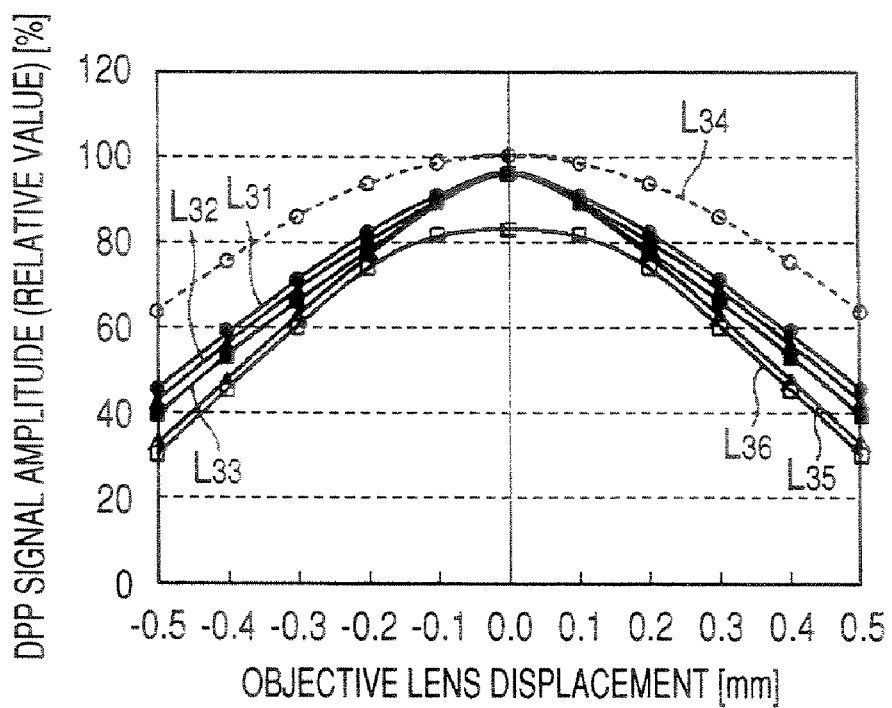
Figure 13B:
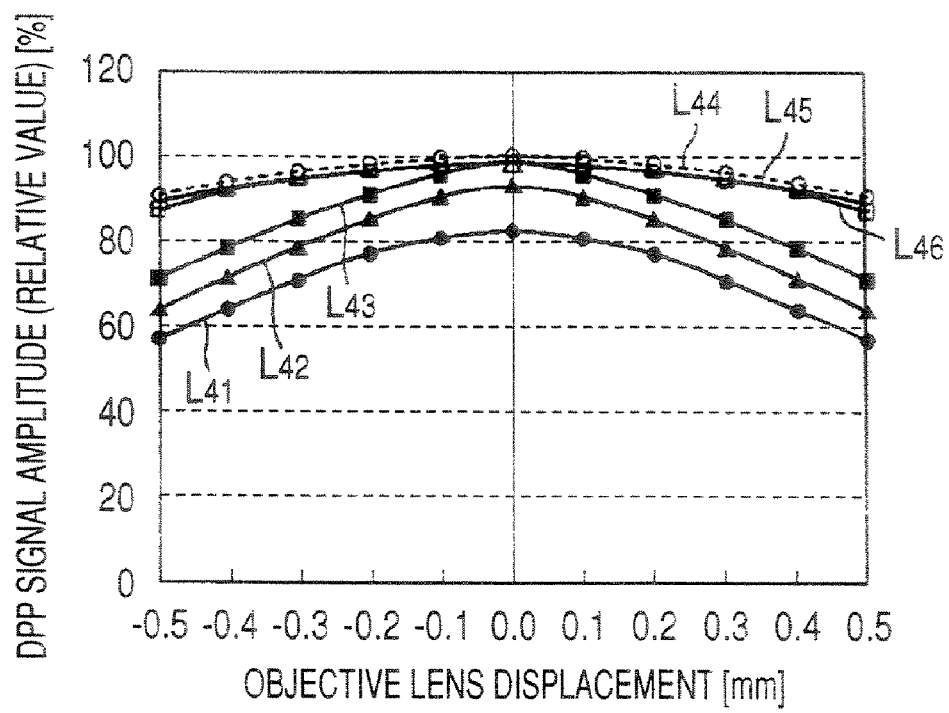
Figure 14:
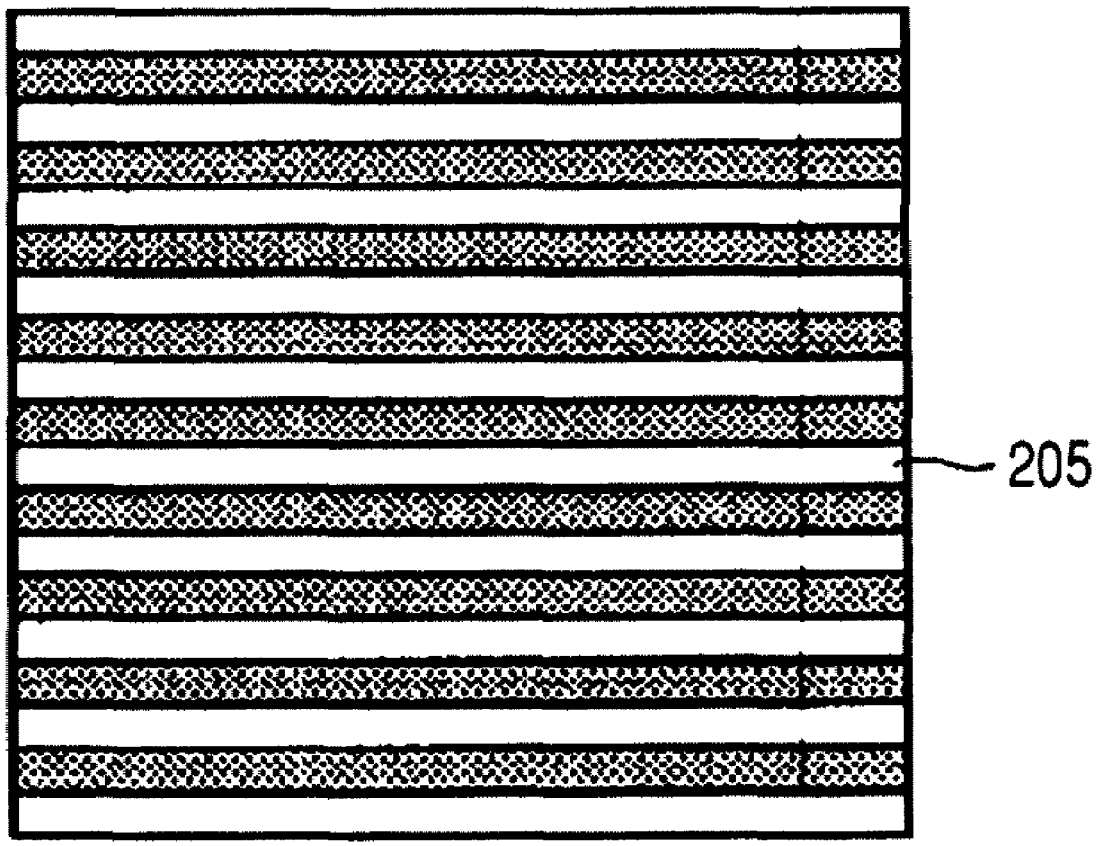
FIG. 14 shows a plan view depicting a diffractive element configuring an optical pickup according to the conventional DPP method.

Next, FIGS. 13A and 13B show the characteristics of the field of view of the DPP signal amplitude when the numeric data is used for the optical pickup 60 according to the four area in-line DPP method as Example 2. FIG. 13A shows the characteristics of the field of view for a DVD-RAM disc, and FIG. 13B shows the characteristics of the field of view for a DVD±R disc. Furthermore, as comparative examples for comparison therewith, the characteristics of the field of view are shown at the same time when the numeric data is used for the optical pickups according to the conventional DPP method, the two area in-line DPP method and the three area in-line DPP method.

In addition, in FIGS. 13A and 13B, the horizontal axis shows a displacement of the objective lens (mm), the vertical axis shows the relative value (%) of the DPP signal amplitude when the objective lens is displaced, that is, representing the relative value when the DPP signal amplitude is considered as 100% at the time when a displacement of the objective lens according to the conventional DPP method is zero, curves $L_{31}$ and $L_{41}$ show the characteristics of the field of view when the optical pickup 60 has $\alpha_2$=0.80, curves $L_{32}$ and $L_{42}$ show the characteristics of the field of view when the optical pickup 60 has $\alpha_2$=0.90, curves $L_{33}$ and $L_{43}$ show the characteristics of the field of view when the optical pickup 60 has $\alpha_2$=1.00, curves $L_{34}$ and $L_{44}$ show the characteristics of the field of view of the optical pickup according to the conventional DPP method, curves $L_{35}$ and $L_{45}$ show the characteristics of the field of view of the optical pickup according to the two area in-line DPP method, and curves $L_{36}$ and $L_{46}$ show the characteristics of the field of view of the optical pickup according to the three area in-line DPP method. In addition, the positions of the sub-spots were the same as those of Example 1 shown in FIGS. 12A and 12B.

In the characteristics of the field of view $L_{31}$, $L_{32}$ and $L_{33}$ of the optical pickup 60 according to Example 2 to which an embodiment of the invention is adapted, as shown in FIG. 13A, in the case of a DVD-RAM disc, the DPP signal amplitude at he field of view=zero hardly drops in the range of $\alpha_2$=0.80 to 1.00, and smooth characteristics of the field of view can be obtained in the wide range of the field of view as similar to Example 1.

Moreover, as shown in FIG. 13B, in the case of a DVD±R disc, in the characteristics of the field of view $L_{41}$, $L_{42}$ and $L_{43}$, smooth characteristics of the field of view are obtained s compared with Example 1, but when $\alpha_2$ is 0.90 or greater, a decrease of the DPP signal amplitude at the field of view=zero is increased.

Thus, for the setting value of $\alpha_2$, it is desirable to set to $\alpha_2$=about 0.90 to 1.00.

Accordingly, the optical pickups 1 and 60 according to Examples 1 and 2 can obtain an excellent DPP signal amplitude when the objective lens is displaced, that is, it can improve the characteristics of the field of view of the tracking error signal.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a light source which emits a light beam of a predetermined wavelength;
a diffractive element which splits the light beam emitted from the light source into at least three light beams;
an objective lens which separately converges the three light beams onto a signal recording surface of an optical disc; and
a photodetector which has a light receiving surface that receives a returning light from the optical disc, wherein
the diffractive element has first to fourth areas provided with a predetermined periodic structure in each of the areas,
the second and third areas are arranged adjacently wherein phases of the periodic structures of the second and third areas are in anti-phase,
the first area is arranged on the opposite side of the third area adjacently to the second area, and a phase of the periodic structure in the first area is in anti-phase with a phase of the periodic structure in the second area,
the fourth area is arranged on the opposite side of the second area adjacently to the third area, and a phase of the periodic structure in the fourth area is in anti-phase with a phase of the periodic structure in the third area, and
the objective lens and the diffractive element satisfy the relationship $W_{12}+W_{13}=\phi_1 \cdot \alpha_1$, where $W_{12}$ is a width of the second area, $W_{13}$ is a width of the third area, $\phi_1$ is a pupil diameter of the objective lens, and $\alpha_1$ is a value between 0.95 and 1.05.

2. An optical pickup comprising:
a light source which emits a light beam of a predetermined wavelength;
a diffractive element which splits the light beam emitted from the light source into at least three light beams;
an objective lens which separately converges the three light beams onto a signal recording surface of an optical disc; and
a photodetector which has a light receiving surface that receives a returning light from the optical disc, wherein
the diffractive element has first to fourth areas provided with a predetermined periodic structure in each of the areas,
the second and third areas are arranged adjacently wherein phases of the periodic structures of the second and third areas are in anti-phase,
the first area is arranged on the opposite side of the third area adjacently to the second area wherein a phase of the periodic structure in the first area is in quadrature with a phase of the periodic structure in the second area,
the fourth area is arranged on the opposite side of the second area adjacently to the third area wherein a phase of the periodic structure in the fourth area is in quadrature with a phase of the periodic structure in the third area, and
the objective lens and the diffractive element satisfy the relationship $W_{22}+W_{23}=\phi_2 \cdot \alpha_2$, where $W_{22}$ is a width of the second area, $W_{23}$ is a width of the third area, $\phi_2$ is a pupil diameter of the objective lens, and $\alpha_2$ is a value between 0.80 and 1.00.

3. An optical disc apparatus comprising:
an optical pickup which records and/or reproduces information from an optical disc; and means for rotating and driving a disc which rotates the optical disc, wherein the optical pickup includes:

a light source which emits a light beam of a predetermined wavelength;

a diffractive element which splits the light beam emitted from the light source into at least three light beams;

an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are in anti-phase, the first area is arranged on the opposite side of the third area adjacently to the second area wherein a phase of the periodic structure in the first area is in anti-phase with a phase of the periodic structure in the second area, the fourth area is arranged on the opposite side of the second area adjacently to the third area wherein a phase of the periodic structure in the fourth area is in anti-phase with a phase of the periodic structure in the third area, and the objective lens and the diffractive element satisfy the relationship $W_{12}+W_{13}=\phi_1 \cdot \alpha_1$, where $W_{12}$ is a width of the second area, $W_{13}$ is a width of the third area, $\phi_1$ is a pupil diameter of the objective lens, and $\alpha_1$ is a value between 0.95 and 1.05.

4. An optical disc apparatus comprising:

an optical pickup which records and/or reproduces information from an optical disc; and means for rotating and driving a disc which rotates the optical disc, wherein the optical pickup includes:

a light source which emits a light beam of a predetermined wavelength;

a diffractive element which splits the light beam emitted from the light source into at least three light beams;

an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are in anti-phase, the first area is arranged on the opposite side of the third area adjacently to the second area wherein a phase of the periodic structure in the first area is in quadrature with a phase of the periodic structure in the second area, the fourth area is arranged on the opposite side of the second area adjacently to the third area wherein a phase of the periodic structure in the fourth area is in quadrature with a phase of the periodic structure in the third area, and the objective lens and the diffractive element satisfy the relationship $W_{22}+W_{23}=\phi_2 \cdot \alpha_2$, where $W_{22}$ is a width of the second area, $W_{23}$ is a width of the third area, $\phi_2$ is a pupil diameter of the objective lens, and $\alpha_2$ is a value between 0.80 and 1.00.

5. An optical disc apparatus comprising:

an optical pickup which records and/or reproduces information from an optical disc; and a unit configured to rotate and drive a disc which rotates the optical disc, wherein the optical pickup includes:

a light source which emits a light beam of a predetermined wavelength;

a diffractive element which splits the light beam emitted from the light source into at least three light beams;

an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are in anti-phase, the first area is arranged on the opposite side of the third area adjacently to the second area wherein a phase of the periodic structure in the first area is in anti-phase with a phase of the periodic structure in the second area, the fourth area is arranged on the opposite side of the second area adjacently to the third area wherein a phase of the periodic structure in the fourth area is in anti-phase with a phase of the periodic structure in the third area, and the objective lens and the diffractive element satisfy the relationship $W_{12}+W_{13}=\phi_1 \cdot \alpha_1$, where $W_{12}$ is a width of the second area, $W_{13}$ is a width of the third area, $\phi_1$ is a pupil diameter of the objective lens, and $\alpha_1$ is a value between 0.95 and 1.05.

6. An optical disc apparatus comprising:

an optical pickup which records and/or reproduces information from an optical disc; and a unit configured to rotate and drive a disc which rotates the optical disc, wherein the optical pickup includes:

a light source which emits a light beam of a predetermined wavelength;

a diffractive element which splits the light beam emitted from the light source into at least three light beams;

an objective lens which separately converges the three light beams onto a signal recording surface of an optical disc; and a photodetector which has a light receiving surface that receives a returning light from the optical disc, wherein the diffractive element has first to fourth areas provided with a predetermined periodic structure in each of the areas, the second and third areas are arranged adjacently wherein phases of the periodic structures of the second and third areas are in anti-phase, the first area is arranged on the opposite side of the third area adjacently to the second area wherein a phase of the periodic structure in the first area is in quadrature with a phase of the periodic structure in the second area, the fourth area is arranged on the opposite side of the second area adjacently to the third area wherein a phase of the periodic structure in the fourth area is in quadrature with a phase of the periodic structure in the third area, and the objective lens and the diffractive element satisfy the relationship $W_{22}+W_{23}=\phi_2 \cdot \alpha_2$, where $W_{22}$ is a width of the second area, $W_{23}$ is a width of the area, $\phi_2$ is a pupil diameter of the objective lens, and $\alpha_2$ is a value between 0.80 and 1.00.

7. The new optical pickup according to claim 1, wherein the anti-phase is a phase shift of 180 degrees.

8. The optical pickup according to claim 1, wherein the first to fourth areas of the diffractive element are rectangular in shape.

9. The optical pickup according to claim 1, wherein $\alpha_1$ is a value between 1.00 and 1.05.

10. The optical pickup according to claim 2, wherein the quadrature is a phase shift of 90 degrees.

11. The optical pickup according to claim 2, wherein the first to fourth areas of the diffractive element are rectangular in shape.

12. The optical pickup according to claim 2, wherein $\alpha_2$ is a value between 0.90 and 1.00.

* * * * *